US009635529B2

United States Patent
Kruglick et al.

(10) Patent No.: US 9,635,529 B2
(45) Date of Patent: Apr. 25, 2017

(54) PAPR ADJUSTMENT USING PRECODER DATA

(71) Applicant: Empire Technology Development LLC, Wilmington, DE (US)

(72) Inventors: Ezekiel Kruglick, Poway, CA (US); Kevin S. Fine, Yverdon-les-Bains (CH)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 293 days.

(21) Appl. No.: 14/297,450

(22) Filed: Jun. 5, 2014

(65) Prior Publication Data

US 2015/0358190 A1    Dec. 10, 2015

(51) Int. Cl.
*H04W 4/18* (2009.01)
*H04L 27/26* (2006.01)
*H04L 27/34* (2006.01)

(52) U.S. Cl.
CPC ........... *H04W 4/18* (2013.01); *H04L 27/2617* (2013.01); *H04L 27/3411* (2013.01)

(58) Field of Classification Search
CPC ....... H03F 1/34; H03F 1/3241; H04L 27/367; H04L 27/2614; H04L 27/2623; H04L 27/2624; H04L 27/2626; H04L 27/2647; H04L 27/3411; H04L 5/0048; H03H 17/0263
See application file for complete search history.

(56) References Cited

U.S. PATENT DOCUMENTS

| 8,204,507 | B2 | 6/2012 | Yu et al. |
| 2004/0136314 | A1* | 7/2004 | Jung ................... H04L 27/2618 370/203 |
| 2006/0178121 | A1* | 8/2006 | Hamalainen .......... H03F 1/0205 455/125 |
| 2010/0191682 | A1* | 7/2010 | Takamatsu ............. G06Q 30/02 706/12 |

(Continued)

OTHER PUBLICATIONS

"Elecfans," accessed at http://web.archive.org/web/20120521091338/http://www.elecfans.comtongxin/119/20120518272317.html, accessed on Jun. 3, 2014, pp. 2.

(Continued)

*Primary Examiner* — John Pezzlo
*Assistant Examiner* — Dharmesh Patel
(74) *Attorney, Agent, or Firm* — Maschoff Brennan

(57) ABSTRACT

In some examples, data to be transmitted by a transmit node to at least one receive node may be compressed according to one or more sets of compression parameters. One or more estimated peak to average power ratios (PAPRs) to transmit one or more resulting versions of compressed data may be calculated based on precoder data associated with the at least one receive node. A version of the compressed data that has an estimated PAPR that is less than a PAPR threshold value may be sent to the transmit node to transmit to the at least one receive node. Alternately, a version of the compressed data that has an estimated PAPR that is a lowest estimated PAPR relative to at least some other estimated PAPRs corresponding to other versions of the compressed data may be sent to the transmit node to transmit to the at least one receive node.

23 Claims, 8 Drawing Sheets

(56) References Cited

U.S. PATENT DOCUMENTS

2013/0083768 A1 4/2013 Liu et al.

OTHER PUBLICATIONS

"From Transcoding to Media Conditioning: IP Media Stream Processing for Mobile, NGN, and IMS Architectures," White Paper, radisys, Jan. 2011, pp. 11.
"Important Information about Verizon Wireless Data Plans and Features," accessed on May 26, 2014, pp. 2.
"ITU paves way for next-generation 4G mobile technologies," accessed at http://web.archive.org/web/20140325184858/http://www.itu.int/net/pressoffice/press_releases/2010/40.aspx, pp. 2 (Oct. 21, 2010).
"LTE Base Stations & the Evolved Radio Access Network," accessed at http://web.archive.org/web/20130527224617/http://www.heavyreading.com/details.asp?sku_id=2308&skuitem_itemid=1151, accessed on Jun. 2, 2014, pp. 3.
"LTE in a Nutshell: The Physical Layer," Telesystem Innovations, White Paper, pp. 18 (2010).
"LTE OFDM, OFDMA and SC-FDMA," accessed at http://web.archive.org/web/20140313154019/http://www.radio-electronics.com/info/cellulartelecomms/lte-long-term-evolution/lte-ofdm-ofdma-scfdma.php, accessed on Jun. 2, 2014, pp. 5.
"Supporting high-dpi pixel-dense "Retina" Displays like iPhones or the iPad 3 with CSS or IMG," accessed at http://web.archive.org/web/20140408044745/http://www.hanselman.com/blog/SupportingHighdpiPixeldenseRetinaDisplaysLikeIPhonesOrTheIPad3WithCSSOrIMG.aspx, pp. 4 (Feb. 21, 2012).
"Zip Files All the Way Down," accessed at http://web.archive.org/web/20131001064210/http://research.swtch.com/zip, pp. 15 (Mar. 18, 2010).
Ghosh, A., et al. "LTE-advanced: next-generation wireless broadband technology [Invited Paper]," Wireless Communications, IEEE 17.3, pp. 10-22 (2010).
Cruz, P. et al., "Experimental Demonstration of PAPR Reduction in 10 Gbit/s SSB-OFDM Direct-Detection Systems Through Symbol Precoding," IEEE MTT-S International Microwave & Optoelectronics Conference (IMOC), pp. 1-5 (2013).
Fleishman, G., "Verizon Wireless Sets iPhone Plans and Throttles Data," accessed at http://web.archive.org/web/20110209124920/http://www.tidbits.com/article/11950?print_version=1, pp. 2 (Feb. 4, 2011).
Han, S. H. and Lee, J.H., "An overview of peak-to-average power ratio reduction techniques for multicarrier transmission," Wireless Communications, IEEE 12.2, pp. 56-65 (2005).
Ahmad, I. et al. "Spectral broadening effects of high-power amplifiers in MIMO-OFDM relaying channels," EURASIP Journal on Wireless Communications and Networking, pp. 1-14 (2013).
Kasiri, K. et al., "A Preprocessing Method for PAPR Reduction in OFDM Systems by Modifying FFT and IFFT Matrices," The 18th Annual IEEE International Symposium on Personal, Indoor and Mobile Radio Communications (PIMRC'07), pp. 1-5 (2007).
Manasseh, E. et al., "Combined channel estimation and PAPR reduction technique for MIMO-OFDM systems with null subcarriers," EURASIP Journal on Wireless Communications and Networking, vol. 201, pp. 1-15 (2012).
Sengar, S. and Bhattacharya, P.P., "Performance Improvement in OFDM System by PAPR Reduction," Signal & Image Processing : An International Journal (SIPIJ) vol. 3, No. 2, pp. 157-169 (2012).
Senst, M. and Ascheid, G., "Optimal output back-off in OFDM systems with nonlinear power amplifiers.", IEEE International Conference on IEEE Communications, pp. 6 (2009).
Wiseman, C. et al., "A remotely accessible network processor-based router for network experimentation," Proceedings of the 4th ACM/IEEE Symposium on Architectures for Networking and Communications Systems, pp. 20-29 (2008).
Chartier, D., "Verizon to optimize content, throttle heavy data users," accessed at https://web.archive.org/web/20151222085240/http://www.macworld.com/article/1157635/verizon_throttle_iphone_data.html, accessed on Jan. 25, 2016, pp. 2.
Kim, A., "Mac OS X Lion Building in Support for Super High Resolution 'Retina' Monitors," accessed at https://web.archive.org/web/20151224235059/http://www.macrumors.com/2011/02/24/mac-os-x-lion-building-in-support-for-super-high-resolution-retina-monitors/, Feb. 24, 2011, pp. 5.

* cited by examiner

PAPR ADJUSTMENT USING PRECODER DATA

BACKGROUND

Unless otherwise indicated herein, the materials described herein are not prior art to the claims in the present application and are not admitted to be prior art by inclusion in this section.

Universal Mobile Telecommunications System (UMTS) Long Term Evolution (LTE) Release 8 provides high peak data rates of 300 Mb/s on the downlink and 75 Mb/s on the uplink for a 20 MHz bandwidth. LTE Release 10, sometimes referred to as LTE Advanced (LTE-A), significantly increases this throughput even further, attaining data rates that are even faster. The LTE and LTE-A standards achieve these high data rates for the downlink by using the Orthogonal Frequency Division Multiple Access (OFDMA) channel access method.

The OFDMA channel access method distributes users over multiple narrowband subcarriers in time and/or frequency. The OFDMA channel access method can cause high values of peak to average power ratio (PAPR) when data patterns that happen to generate reinforcing spikes at a given time as given pieces of data from neighboring subcarriers collectively contribute to the time value of a baseband signal. Large PAPR may drive up the cost of electronics that transmit OFDMA signals, may increase power consumption of the electronics, and/or may limit transmission strength or cause other issue(s).

SUMMARY

Technologies described herein generally relate to the reduction of PAPR in communication networks.

In some examples, a method to tune PAPR of a transmit node is described. The method may include compressing a portion of raw data to be transmitted by the transmit node to at least one receive node according to a first set of compression parameters to generate first compressed data. The method may also include calculating, based on precoder data associated with the at least one receive node, a first estimated PAPR of the transmit node to transmit the first compressed data to the at least one receive node. The method may also include, in response to the first estimated PAPR being less than a PAPR threshold value, sending the first compressed data to the transmit node. The method may also include, in response to the first estimated PAPR being greater than the PAPR threshold value: altering at least one parameter in the first set of compression parameters to generate a second set of compression parameters; compressing the portion of the raw data according to the second set of compression parameters to generate second compressed data; and in response to a second estimated PAPR of the transmit node to transmit the second compressed data to the at least one receive node being less than the PAPR threshold value, sending the second compressed data to the transmit node.

In some examples, a compression apparatus configured to tune PAPR of a transmit node is described. The compression apparatus may include a tunable compressor, a PAPR estimator, a PAPR comparator, and a parameter tuner. The tunable compressor may be configured to compress a portion of raw data to be transmitted by the transmit node to at least one receive node according to a first set of compression parameters to generate first compressed data. The PAPR estimator may be configured to calculate, based on precoder data associated with the at least one receive node, a first estimated PAPR of the transmit node to transmit the first compressed data to the at least one receive node. The PAPR comparator may be coupled to the PAPR estimator and may be configured to compare the first estimated PAPR to a PAPR threshold value. The parameter tuner may be coupled to the tunable compressor and to the PAPR comparator and may be configured to modify compression parameters of the tunable compressor based on the comparison of the first estimated PAPR to the PAPR threshold value. In response to the first estimated PAPR being less than the PAPR threshold value, the PAPR estimator may be further configured to send the first compressed data to the transmit node. In response to the first estimated PAPR being greater than the PAPR threshold value: the parameter tuner may be further configured to alter at least one parameter in the first set of compression parameters to generate a second set of compression parameters; the tunable compressor may be further configured to compress the portion of the raw data according to the second set of compression parameters to generate second compressed data; and in response to a second estimated PAPR of the transmit node to transmit the second compressed data to the at least one receive node being less than the PAPR threshold value, the PAPR estimator may be further configured to send the second compressed data to the transmit node.

In some examples, a method to tune PAPR of a transmit node is described. The method may include compressing a portion of raw data to be transmitted by the transmit node to at least one receive node multiple times according to multiple different sets of compression parameters to generate multiple different versions of compressed data. The method may also include calculating, based on precoder data associated with the at least one receive node and for each of the different versions of the compressed data, an estimated PAPR of the transmit node to transmit a corresponding one of the different versions of the compressed data to the at least one receive node. Multiple different estimated PAPRs may be calculated that include a different estimated PAPR for each of the different versions of the compressed data. The method may also include identifying a lowest estimated PAPR relative to at least some of the different estimated PAPRs. The method may also include sending a particular one of the different versions of the compressed data that corresponds to the lowest estimated PAPR to the transmit node to be transmitted to the at least one receive node.

In some examples, a compression apparatus configured to tune PAPR of a transmit node is described. The compression apparatus may include a tunable compressor, a PAPR estimator, and a PAPR comparator. The tunable compressor may be configured to compress a portion of raw data to be transmitted by the transmit node to at least one receive node multiple times according to multiple different sets of compression parameters to generate multiple different versions of compressed data. The PAPR estimator may be coupled to the tunable compressor and may be configured to calculate, based on precoder data associated with the at least one receive node and for each of the different versions of the compressed data, an estimated PAPR of the transmit node to transmit a corresponding one of the different versions of the compressed data to the at least one receive node. Multiple different estimated PAPRs may be calculated that include a different estimated PAPR for each of the different versions of the compressed data. The PAPR comparator may be coupled to the PAPR estimator and may be configured to compare each of the different estimated PAPRs to each other and to identify a lowest estimated PAPR relative to at least some of the different estimated PAPRs. The PAPR estimator may be further configured to send a particular one of the different versions of the compressed data that corresponds to the lowest estimated PAPR to the transmit node to be transmitted to the at least one receive node.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. In the drawings:

DETAILED DESCRIPTION

Figure 1A:
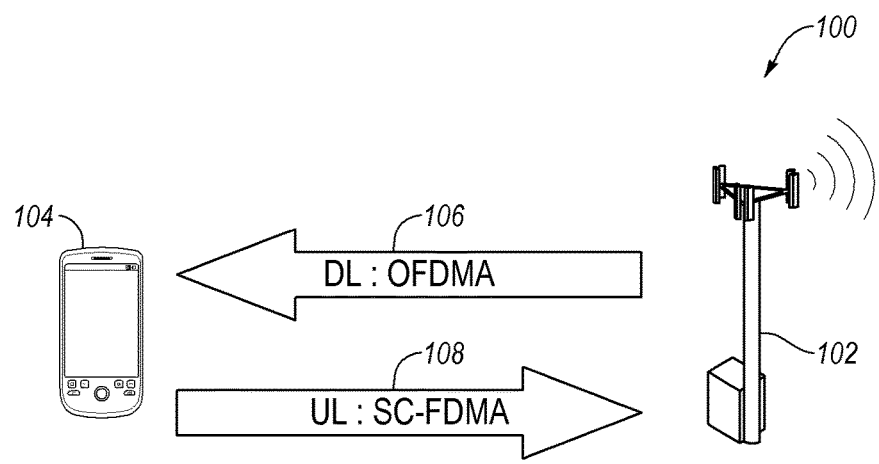
FIG. 1A is a diagram of an example communication network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products that generally relate to reducing peak to average power ratio (PAPR) in communication networks. Briefly stated, in these and other embodiments, data to be transmitted by a transmit node to at least one receive node may be compressed according to one or more sets of compression parameters. One or more estimated PAPRs to transmit one or more resulting versions of compressed data may be calculated based on precoder data associated with the at least one receive node. A version of the compressed data that has an estimated PAPR that is less than a PAPR threshold value may be sent to the transmit node to transmit to the at least one receive node. Alternately, a version of the compressed data that has an estimated PAPR that is a lowest estimated PAPR relative to at least some other estimated PAPRs corresponding to other versions of the compressed data may be sent to the transmit node to transmit to the at least one receive node.

For example, a portion of data may be compressed and PAPR may be estimated for the compressed portion of the data using precoder data associated with one or more communication links in the communication network. The compressed portion of the data may be transmitted over the communication network in response to the estimated PAPR being below a PAPR threshold value. Alternately, and in response to the estimated PAPR being too high or above the PAPR threshold value, one or more compression parameters may be altered and used to generate a new compressed portion, a new PAPR may be estimated for the new compressed portion, and the new compressed portion may be transmitted over the communication network or one or more compression parameters may be altered depending on whether the new estimated PAPR is above or below the PAPR threshold value.

Alternately or additionally, the portion of data may be compressed multiple times in parallel using different compression parameters to generate multiple compressed portions. A PAPR may be estimated for each of the compressed portions to generate multiple estimated PAPRs. A lowest estimated PAPR relative to at least some of the estimated PAPRs may be identified. In some embodiments, the lowest estimated PAPR is the lowest of all the estimated PAPRs. In other embodiments, the lowest estimated PAPR is lower than some, but not necessarily all, of the estimated PAPRs, or is lower than the PAPR threshold value. The compressed portion corresponding to the lowest estimated PAPR may then be transmitted over the communication network.

Some embodiments described herein may relate to and/or may be implemented in a communication network that is compliant with the 3rd Generation Partnership Project's (3GPP) LTE radio access network specification. Descriptions involving LTE may also apply to 3GPP's LTE-A radio access network specification. The embodiments described herein may alternately or additionally be applicable to and/or in other radio access networks and/or other communication networks in general.

The techniques described herein may be used with various channel access methods such as code division multiple access (CDMA), time division multiple access (TDMA), frequency division multiple access (FDMA), OFDMA, SC-FDMA, and other channel access methods. Systems or networks that implement a particular channel access method may be referred to as such a system or network. For example, a system or network that implements CDMA may be referred to as a CDMA system or network. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM(R), etc. UTRA and E-UTRA are part of UMTS. 3GPP LTE is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). cdma2000 and UMB are described in documents from an organization named "3rd Generation Partnership Project 2" (3GPP2).

In the discussion that follows, PAPR will first be described with reference to FIGS. 1A-2. Following the discussion of PAPR, reduction of PAPR using precoder data according to some embodiments will then be described with reference to FIGS. 3-8.

FIG. 1A is a diagram of an example communication network 100, arranged in accordance with at least some embodiments described herein. In some embodiments, the communication network 100 may include a radio access network architecture of an E-UMTS. The E-UMTS may include an LTE radio access network, for instance. The LTE radio access network may include an E-UTRA Network (E-UTRAN). Other types of network architecture may alternately or additionally be implemented.

The communication network 100 may include an access point 102 and a user equipment (UE) 104. More generally, the communication network 100 may include one or more access points 102 and one or more UEs 104. Data may be communicated between the UE 104 and the access point 102 via one or more communication links that may include downlinks (DLs) and/or uplinks (ULs). For example, data may be transmitted from the access point 102 to the UE 104 over a DL 106 and/or data may be transmitted from the UE 104 to the access point 102 over a UL 108.

The access point 102 may include a base station in a cellular communication network, an evolved Node B (eNB) in an LTE or LTE-A network, or other suitable access point.

The UE 104 may include and/or may be referred to as a mobile device, a terminal, an access terminal (AT), a mobile station (MS), a subscriber unit, a station, or other suitable UE. Alternately or additionally, the UE 104 may include a mobile phone, a smartphone, a laptop computer, or other suitable UE.

In some embodiments, the communication network 100 may implement OFDMA for transmissions over the DL 106. Alternately or additionally, the communication network 100 may implement SC-FDMA for transmissions over the UL 108. OFDMA and SC-FDMA are both examples of channel access methods that may allow several communication nodes, such as several UEs 104, to connect to the same multipoint transmission medium, such as the access point 102, to transmit over it and/or to share its capacity. More generally, embodiments described herein may use any suitable channel access method for the DL 106 and/or the UL 108, including OFDMA, SC-FDMA, TDMA, packet mode multiple access, CDMA/spread spectrum multiple access (SSMA), space division multiple access (SDMA), or other suitable channel access method.

Figure 1B:
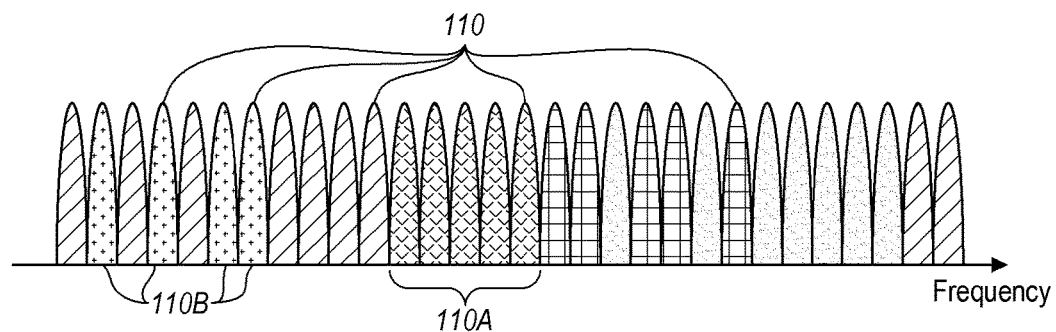
FIG. 1B illustrates an example of an OFDMA channel access method.

FIG. 1B illustrates an example of the OFDMA channel access method, arranged in accordance with at least some embodiments described herein. As illustrated in FIG. 1B, in OFDMA, a frequency band may be broken into a relatively large number of narrowband subcarriers 110, only some of which are labeled in FIG. 1B for simplicity. Insofar as the subcarriers 110 may be orthogonal in OFDMA, they may be spaced relatively close together. Users, e.g., UEs such as the UE 104, may be distributed over the subcarriers 110 in time and/or frequency.

In more detail, data for each of multiple DLs may be transmitted in parallel over a set of one or more subcarriers 110. As an example, FIG. 1B illustrates various sets of subcarriers 110, including a first set 110A of five of the subcarriers 110 and a second set 110B of four of the subcarriers 110. The first set 110A may correspond to the DL 106 of FIG. 1A between the access point 102 and the UE 104 while the second set 110B may correspond to a different DL between the access point 102 and a different UE. Other sets of subcarriers corresponding to other DLs are illustrated in FIG. 1B. Each set of subcarriers in FIG. 1B is denoted by a different fill pattern.

Figure 1C:
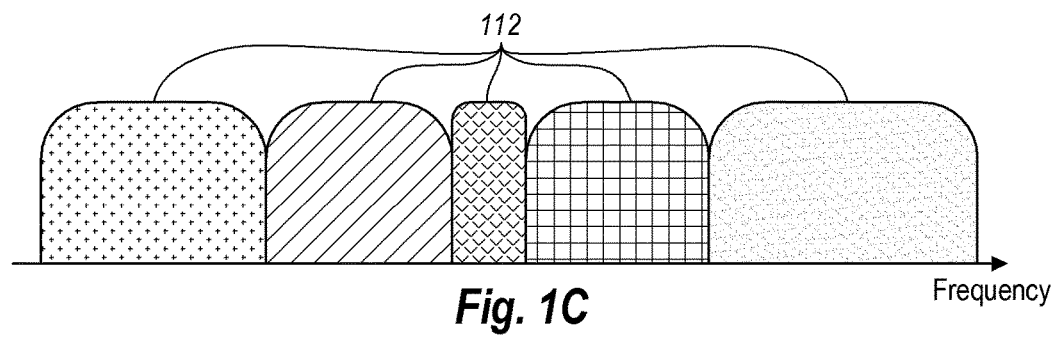
FIG. 1C illustrates an example of a single carrier-frequency division multiple access (SC-FDMA) channel access method.

FIG. 1C illustrates an example of the SC-FDMA channel access method, arranged in accordance with at least some embodiments described herein. As illustrated in FIG. 1C, in SC-FDMA, the frequency band may be broken into a relatively smaller number of higher bandwidth subcarriers 112 as compared to OFDMA. Each of the subcarriers 112 may correspond to a different UL. For example, one of the subcarriers 112 may correspond to the UL 108 of FIG. 1A between the UE 104 and the access point 102, while the other subcarriers 112 may correspond to other ULs between other UEs and the access point 102.

Referring to FIGS. 1A-1C, OFDMA may be relatively more spectrally efficient than SC-FDMA. However, OFDMA may cause relatively higher PAPR values than SC-FDMA. As such, OFDMA may be unsuitable for the UL 108 insofar as the UE 104 may include relatively cheaper electronics than the access point 102, which cheaper electronics may be unable to effectively transmit or otherwise process outgoing OFDMA signals due to their relatively higher PAPR values.

Figure 2:
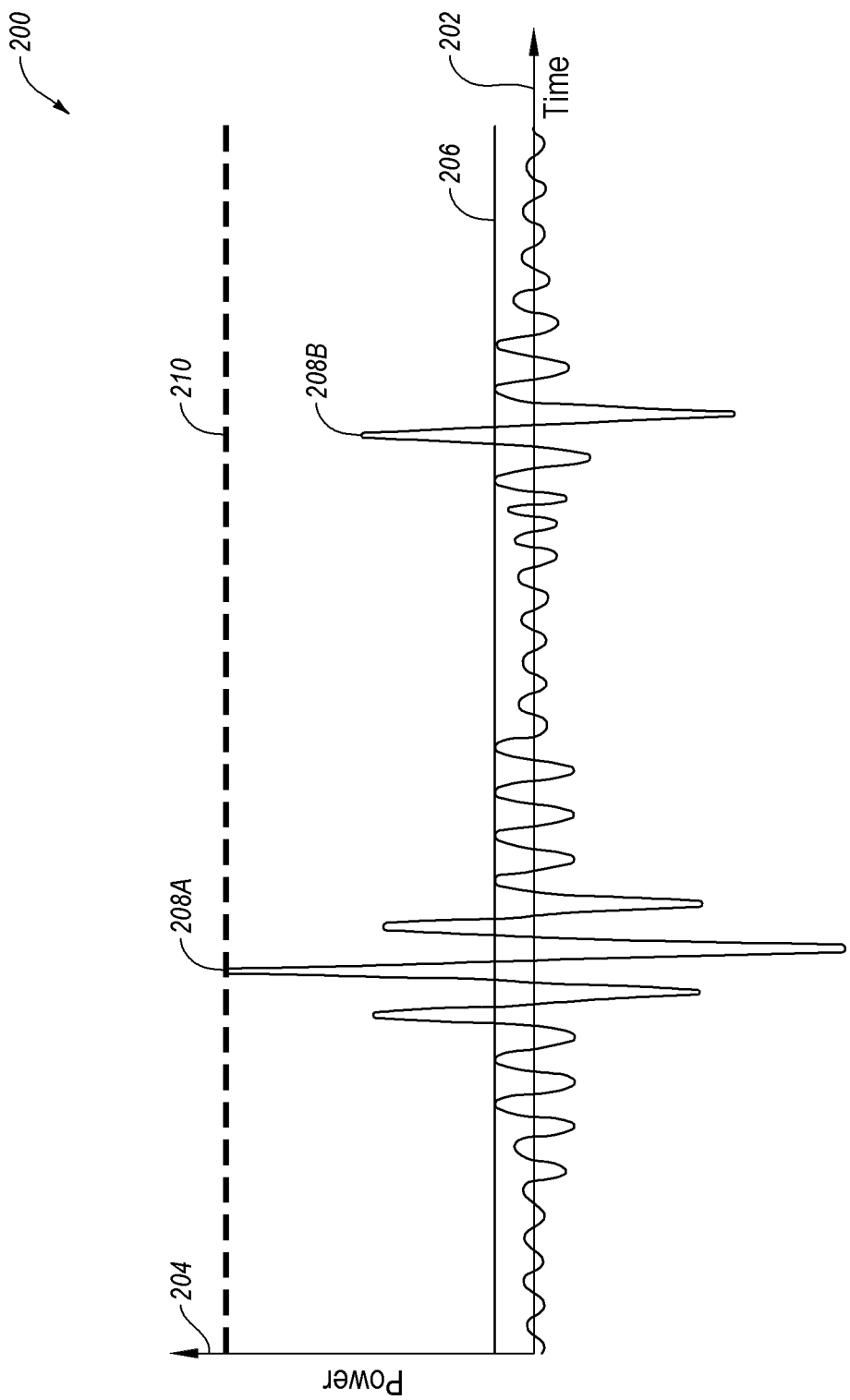
FIG. 2 illustrates an example baseband signal.

FIG. 2 illustrates an example baseband signal 200 that may correspond to an LTE OFDMA DL, arranged in accordance with at least some embodiments described herein. As used herein, a baseband signal may refer to a signal at a baseband frequency prior to multiplication or translation up to a passband frequency and subsequent modulation for transmission. In FIG. 2, a horizontal axis 202 may correspond to time and a vertical axis 204 may correspond to power. Thus, FIG. 2 may illustrate the baseband signal 200 in terms of power as a function of time.

FIG. 2 additionally includes a first reference line 206. The first reference line 206 may refer to or be at an average power of the baseband signal 200.

OFDMA may result in occasional high amplitude peaks 208A and 208B in the baseband signal 200 due to the statistics of combining together many narrowband signals, which narrowband signals may correspond to the subcarriers 110 of FIG. 1B. More particularly, the high amplitude peaks 208A and 208B, which represent power spikes in the baseband signal 200, may be caused by data patterns that happen to generate reinforcing spikes at a given time as given pieces of data from neighboring subcarriers collectively contribute to the time value of the baseband signal 200.

FIG. 2 additionally includes a second reference line 210. The second reference line 210 may refer to or be at a peak power of the baseband signal 200. In particular, the second reference line 210 may be at a power corresponding to the high amplitude peak 208A, which is the peak power in the example of FIG. 2.

As defined herein, PAPR includes peak to average power ratio. PAPR may be expressed in decibels (dB) as the ratio of the peak power over the average power during a symbol interval or other interval. Thus, in the example of FIG. 2, the PAPR of the baseband signal 200 may include the ratio of the peak power of the baseband signal 200 identified by the second reference line 210 to the average power of the baseband signal 200 identified by the first reference line 206. The specific value of the PAPR of the baseband signal 200 may be about 8.5 dB in the example of FIG. 2.

Access points, such as the access point 102 of FIG. 1A, in LTE and/or LTE-A networks and/or in potentially other communication networks may include a final stage High Power Amplifier (HPA). In general, the HPA may be operated in a linear gain region to produce an undistorted transmitted signal at the expense of relatively low transmission strength. The transmission strength can be increased by driving the HPA out of its linear gain region and into saturation at the expense of potentially severe nonlinear signal distortions. HPAs that can process OFDMA DLs without distortion in view of relatively large PAPR may typically be more expensive and/or may consume relatively more power than HPAs that cannot process OFDMA DLs without distortion in view of relatively large PAPR. Thus, relatively large PAPR may drive up the cost of the HPA and/or may increase power consumption of the HPA, while relatively low PAPR may allow for relatively stronger and/or clearer transmission of OFDMA DLs over greater distance from the same access point.

Some methods to reduce PAPR typically have at least one of three disadvantages that may include: 1) a reduction of total useful bandwidth by requiring extra "side information" to be transmitted to untangle modified data, 2) an increase in Bit Error Rate (BER) which reduces bandwidth, and/or 3) inability to be implemented without significant changes to the LTE, LTE-A, or other applicable radio access (or communication) network specification. In comparison, some embodiments described herein to reduce PAPR may be implemented without any or with reduced influence of the three disadvantages listed above. In particular, some embodiments described herein may be implemented at least substantially without a significant reduction of total useful bandwidth and within LTE, LTE-A, other radio access network specifications, or other communication network specifications at least substantially without significant changes to the applicable specification.

Figure 3:
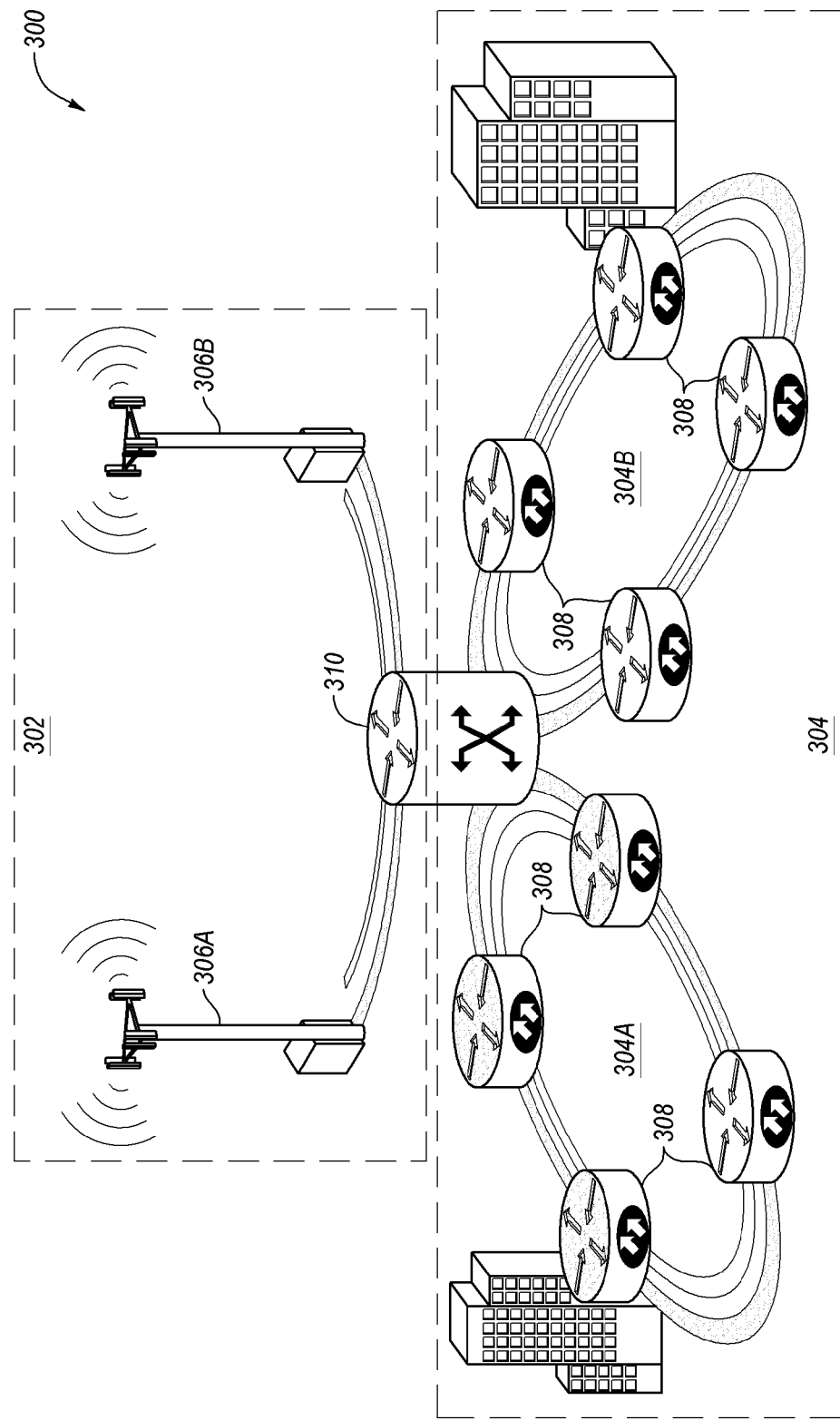
FIG. 3 is a diagram of another example communication network.

FIG. 3 is a diagram of another example communication network 300, arranged in accordance with at least some embodiments described herein. The communication network 300 may include a radio access network 302 and a metro network 304 that may include one or more metro rings 304A and 304B.

The radio access network 302 may include one or more access points 306A and 306B. Each of the access points 306A and 306B may correspond to or include the access point 102 of FIG. 1A and/or may include a base station or eNB. Alternately or additionally, the radio access network 302 may correspond to or include the communication network 100 of FIG. 1A. Thus, although not illustrated in FIG. 3, the radio access network 302 may additionally include one or more UEs, such as the UE 104 of FIG. 1A. The radio access network 302 and/or the metro network 304 may be communicatively coupled to a longhaul backbone (not illustrated).

Each of the metro rings 304A and 304B of the metro network 304 may include one or more routers 308 or other network elements arranged in a metro ring configuration. The routers 308 may include Internet routers or other suitable routers.

The communication network 300 of FIG. 3 may additionally include a gateway 310 that communicatively couples the radio access network 302 to the metro network 304 and/or to the longhaul backbone. More generally, the gateway 310 may be configured to communicatively couple the radio access network 302 to any other network that uses different protocols than the radio access network 302. The gateway 310 may include an asynchronous transfer mode (ATM) router, a multiservice switch, a media gateway, or other suitable gateway. In these and other embodiments, the gateway 310 may alternately or additionally include one or more network processors, protocol translators, impedance match devices, rate converters, fault isolators, signal translators, and/or other devices or components to provide system interoperability between the radio access network 302 and the metro network 304, the longhaul backbone, or other network(s).

Figure 4:
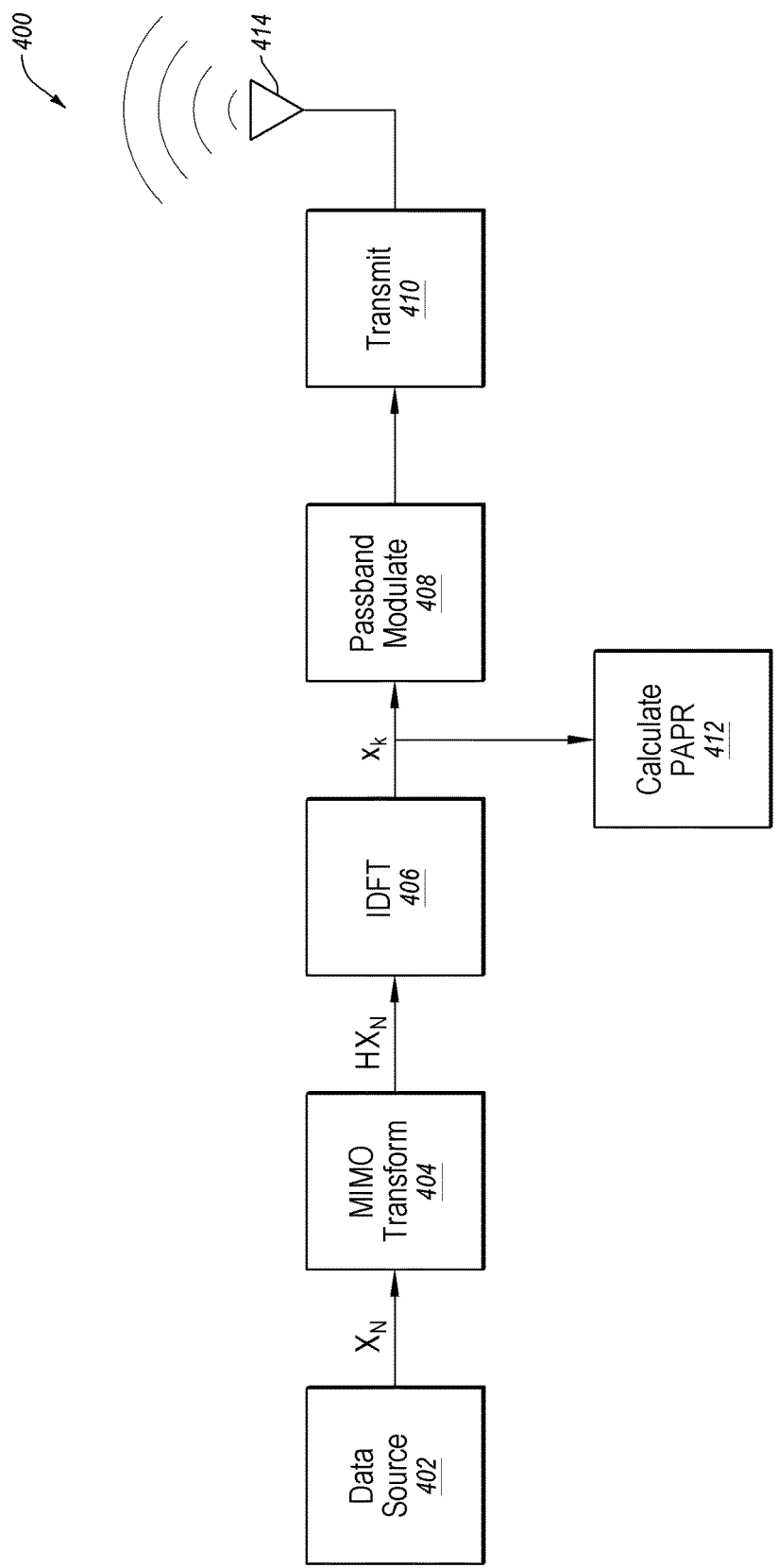
FIG. 4 is a flowchart of an example OFDMA process flow.
Figure 5:
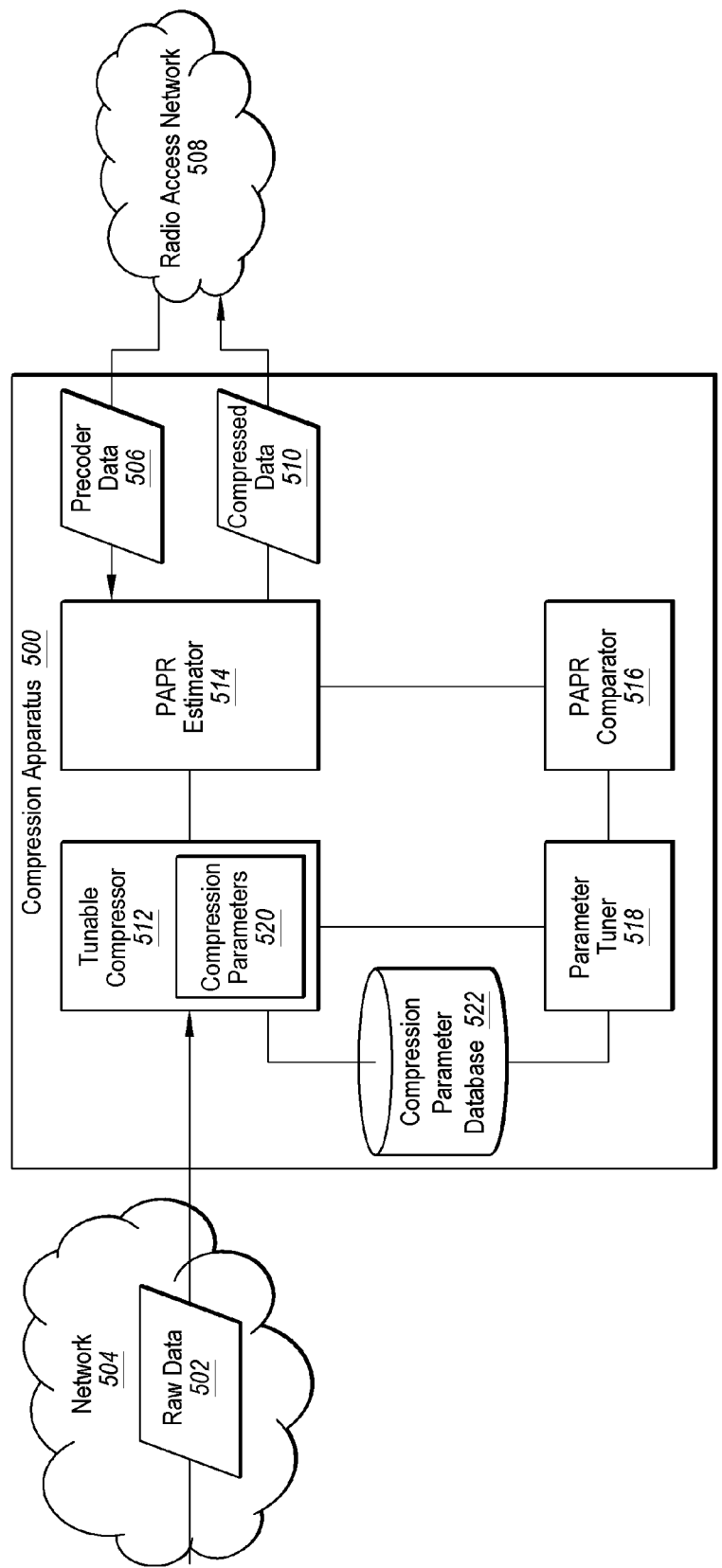
FIG. 5 is a block diagram of an example embodiment of a compression apparatus.

According to some embodiments described herein, the communication network 300 may additionally include a compression apparatus (see FIG. 5). The compression apparatus may be included in or near the gateway 310, in or near one or more of the access points 306A and 306B, or at another suitable location within the communication network 300, such as between the gateway 310 and one or both of the access points 306A and 306B. In general, the compression apparatus may be configured to reduce or tune PAPR in the communication network 300 as described in more detail below. In one embodiment, the compression apparatus may be configured to compress data from the metro network 304 or longhaul backbone to the radio access network 302 before the data is transmitted wirelessly. The compression apparatus may compress the data using tunable compression parameters that may be tuned to generate compressed data with an estimated PAPR that is less than a particular PAPR threshold or that is lower than the estimated PAPR that may result from compression of the data using different compression parameters. Prior to discussing an example compression apparatus with respect to FIG. 5, an example OFDMA process flow will be described with respect to FIG. 4.

FIG. 4 is a flowchart of an example OFDMA process flow 400 to generate an LTE DL signal, arranged in accordance with at least some embodiments described herein. The process flow 400 may be implemented, in whole or in part, by an access point, such as the access points 102, 306A, and/or 306B of FIGS. 1A and 3, and/or by a compression apparatus such as described with respect to FIG. 5. The process flow 400 includes various operations, functions, or actions as illustrated by one or more of blocks 402, 404, 406, 408, 410, and/or 412. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed embodiments. The process flow 400 may begin at block 402.

In block 402 ["Data Source"], raw data may be assembled into a vector $X_N$ that is N symbols long by a data source. The data source may include a gateway, such as the gateway 310 of FIG. 3, and/or a component of a compression apparatus. The vector $X_N$ may include compressed data. The vector $X_N$ may be received by an access point, such as the access points 102, 306A, and/or 306B of FIGS. 1A and 3, and/or by the compression apparatus or a component thereof. Block 402 may be followed by block 404.

In block 404 ["MIMO Transform"], the vector $X_N$ may undergo a MIMO transform based on precoder data to generate a transformed set of vectors $HX_N$. The precoder data may include channel state information for each of one or more DLs, a center frequency and/or frequency band of each of multiple subcarriers of the one or more DLs, such as the subcarriers 110 of FIG. 1B, last known speeds and/or velocities of one or more corresponding UEs, a Doppler spread associated with each of the one or more UEs, a coherence time for each of the one or more UEs, or other suitable precoder data. The MIMO transform based on precoder data may be configured to assign appropriate weighting (phase and/or gain) in the transformed set of vectors $HX_N$ to adjust some measure of total throughput from the access point, such as sum performance, max-min fairness, or some other measure. Block 404 may be followed by block 406.

In block 406 ["IDFT"], the transformed set of vectors $HX_N$ may undergo an inverse discrete Fourier transform (IDFT) to generate baseband time sequences $x_k$, which may include discrete points on a continuous function $x(t)$ given by equation 1:

$$x(t) = \frac{1}{\sqrt{N}} \sum_{n=0}^{N-1} X_n e^{j2\pi n \Delta f t}, \quad \text{(equation 1)}$$

$$0 \leq t \leq T$$

where $j=\sqrt{-1}$, $\Delta f$ is a subcarrier spacing, and $T=1/\Delta f$ in OFDMA. Block 406 may be followed by block 408.

In block 408 ["Passband Modulate"], the baseband time sequences $x_k$ may be converted to passband time sequences, e.g., at a passband frequency or frequencies. Block 408 may be followed by block 410.

In block 410 ["Transmit"], the passband time sequences may be transmitted via one or more antennas 414.

Block 406 may alternately or additionally be followed by block 412. Block 412 may be performed before, after, and/or at least partially in parallel with block 408, and/or blocks 408 and 410 may be omitted altogether. In block 412 ["Calculate PAPR"], an estimated PAPR may be estimated, e.g., calculated, from the baseband time sequences $x_k$. In these and other embodiments, the PAPR may be defined according to equation 2:

$$PAPR \stackrel{def}{=} \frac{\max(|x(t)|^2)}{1/T \int_0^T |x(t)|^2 dt} \quad \text{(equation 2)}$$

In some embodiments, the baseband time sequences $x_k$ may be used, rather than using the continuous function $x(t)$, to calculate estimated PAPR to arbitrary accuracy by oversampling points at NL equidistant samples of the continuous function $x(t)$, where L is an integer larger than 1. The oversampling may be implemented by padding data blocks of the transformed set of vectors $HX_N$ with $(L-1)N$ zeroes before performing the IDFT at block 406. Accordingly, $x(t)$ may be calculated at NL equally spaced points in a time interval $0 \leq t \leq T$ and the estimated PAPR may be calculated according to equation 3:

$$PAPR \approx \frac{\max_{0 \leq k \leq NL-1}(|x_k|^2)}{\text{mean}(|x_k|^2)} \quad \text{(equation 3)}$$

According to equation 3, the estimated PAPR may be calculated as the maximum of $|x_k|$ squared, divided by the mean of all $|x_k|$ squared values. The estimated PAPR calculation according to equation 3 may approach the PAPR definition according to equation 2 as L approaches infinity. In some embodiments, the value of L used in equation 3 to calculate estimated PAPR may be 4, or some value above or below 4. Reference may be made to Seung Hee Han et al, "An Overview of Peak-to-Average Power Ratio Reduction Techniques for Multicarrier Transmission" in *IEEE Wireless Communications* (April 2005), pages 56-65, which is herein incorporated by reference, for an explanation of the estimated PAPR calculation of equation 3.

In OFDMA, data may be encoded as Fourier coefficients of the continuous function $x(t)$ and/or of the baseband time sequences $x_k$. As such, the relation between bits in the vector $X_N$ and amplitudes of the baseband time sequences $x_k$, and thus PAPR in the transmitted signal, may be complicated. Small changes in bit ordering in the vector $X_N$ can cause large changes in PAPR. Some embodiments described herein may leverage this sensitivity to reduce estimated PAPR prior to transmission. In particular, the bits in the vector $X_N$ may be altered if the estimated PAPR is too high by compressing the corresponding raw data using different compression parameters. For example, a portion of the raw data may be compressed using first compression parameters to generate first compressed data corresponding to the vector $X_N$. If the estimated PAPR is above a PAPR threshold value, the portion of the raw data may be compressed using second compression parameters different from the first parameters to generate second compressed data corresponding to the vector $X_N$. The estimated PAPR may be calculated and the compression parameters may be altered until the estimated PAPR is sufficiently small, e.g., is below the PAPR threshold value. After the estimated PAPR is sufficiently small, the corresponding vector $X_N$ may be processed and transmitted as generally described with respect to FIG. 4.

FIG. 5 is a block diagram of an example embodiment of a compression apparatus 500, arranged in accordance with at least some embodiments described herein. In general, the compression apparatus 500 may be configured to tune PAPR of a transmit node. The transmit node may include an access point, such as the access points 102, 306A, and/or 306B of FIGS. 1A and 3. The compression apparatus 500 may be included in the transmit node (or access point), in a gateway, or in between the transmit node and the gateway. Alternately or additionally, the compression apparatus 500 may be communicatively coupled to an output of the gateway and/or to an input of the transmit node.

As illustrated in FIG. 5, the compression apparatus 500 may receive, from a network 504, raw data 502 to be transmitted by the transmit node to at least one receive node. The at least one receive node may include a UE, such as the UE 104 of FIG. 1A. The network 504 may correspond to the metro network 304 and/or the longhaul backbone discussed with respect to FIG. 3. When the compression apparatus 500 is implemented as part of a gateway, the compression apparatus 500 may receive the raw data 502 directly from the network 504. Alternately, when the compression apparatus 500 is implemented downstream of the gateway, the compression apparatus 500 may receive the raw data 502 from the gateway.

The compression apparatus 500 may also receive precoder data 506 from a radio access network 508 and may provide compressed data 510 to the radio access network 508. The transmit node and the at least one receive node may be included in the radio access network 508. The compressed data 510 may include a compressed version of the raw data 502. In some embodiments, the raw data 502 may be compressed using tunable compression parameters to reduce estimated PAPR.

The precoder data 506 may be available at the transmit node, which may include an access point of the radio access network 508. The precoder data 506 may be delivered to the compression apparatus 500 over an X1 administrative network or other network in some embodiments. Commands for requesting precoder data, such as the precoder data 506, may commonly be used for management purposes and may alternately or additionally be used to request precoder data to estimate PAPR as described herein. In some embodiments, the compression apparatus 500 may be included in the transmit node and/or may be co-located with the transmit node and the precoder data 506 may be delivered to the compression apparatus 500 by administrative processes.

The compression apparatus 500 may include a tunable compressor 512, a PAPR estimator 514, a PAPR comparator 516, and a parameter tuner 518. The compression apparatus 500 and/or one or more of the tunable compressor 512, the PAPR estimator 514, the PAPR comparator 516, and/or the parameter tuner 518 may be implemented in hardware, software, or a combination thereof. For instance, the compression apparatus 500 and/or one or more of the tunable compressor 512, the PAPR estimator 514, the PAPR comparator 516, and/or the parameter tuner 518 may be implemented in one or more application-specific integrated circuits (ASICs) and/or one or more field-programmable gate arrays (FPGAs) configured to perform the functions and operations described herein.

Alternately or additionally, the compression apparatus 500 and/or one or more of the tunable compressor 512, the PAPR estimator 514, the PAPR comparator 516, and/or the parameter tuner 518 may include computer instructions executable by a processor to perform the functions and operations described herein. The computer instructions may be stored in a non-transitory computer-readable medium, examples of which are described in more detail below. Embodiments described herein may include an apparatus such as a computer that includes a processor and a non-transitory computer-readable medium such as a memory communicatively coupled to the processor. The non-transitory computer-readable medium may include stored thereon the compression apparatus 500 and/or one or more of the tunable compressor 512, the PAPR estimator 514, the PAPR comparator 516, and/or the parameter tuner 518 that are executable by the processor to perform the functions and operations described herein. The tunable compressor 512, the PAPR estimator 514, the PAPR comparator 516, and the parameter tuner 518 will now be described.

The tunable compressor 512 may be coupled, e.g., via a communication bus, to the PAPR estimator 514 and the parameter tuner 518. The tunable compressor 512 may be configured to compress the raw data 502 to be transmitted by a downstream transmit node, e.g., in the radio access network 508. The raw data 502 may be compressed according to a set of compression parameters 520. The set of compression parameters 520 may be selected from a compression parameter database 522 that is included in or is otherwise accessible to the compression apparatus 500. The compression parameter database 522 may be coupled to the tunable compressor 512 and the parameter tuner 518. The compression parameter database 522 and/or the parameter tuner 518 may be omitted in some embodiments, as described in more detail below.

Each set of compression parameters 520 may include one or more of block size, compression tree scheme, symbol diversity, algorithm seeds, or other compression parameters. In some embodiments, different sets of compression parameters 520 within the compression parameter database 522 may be associated with different compression formats. For example, one set of compression parameters 520 may be associated with one compression format, another set of compression parameters 520 may be associated with another compression format, and so on. The compression formats may include, for example, Lempel-Ziv and its variants, ZIP, GZIP, Advanced Audio Coding (AAC), Joint Photographic Experts Group (JPEG) compression, Moving Picture Experts Group (MPEG)-2 Part 2, MPEG-4 Part 2, H.264 (MPEG-4 Part 10), Theora, Dirac, RealVideo RV40, VP8, High Efficiency Video Coding (HEVC), or other suitable compression formats.

The tunable compressor 512 may compress a portion of the raw data 502 at a time according to the set, e.g., a first set, of compression parameters 520 to generate first compressed data. In some embodiments, the tunable compressor 512 may compress the same portion of the raw data 502 according to a second set of compression parameters 520 from the compression parameter database 522 to generate second compressed data. Other compressed data may be generated by compressing the same portion of the raw data according to other sets of compression parameters 520 from the compression parameter database 522. The first, second, and other compressed data may be generated sequentially by the tunable compressor 512 until an estimated PAPR of the transmit node to transmit the corresponding compressed data to the at least one receive node is less than a PAPR threshold value. Alternately or additionally, the first, second, and other compressed data may be generated simultaneously or substantially simultaneously by the tunable compressor 512 (or by multiple tunable or non-tunable compressors).

The PAPR estimator 514 may be coupled to the tunable compressor 512 and to the PAPR comparator 516. The PAPR estimator 514 may be configured to receive the precoder data 506 from the radio access network 508. The precoder data 506 may be associated with the at least one receive node. The precoder data 506 may be received by the PAPR estimator 514 repeatedly over time such that estimated PAPR may be calculated based on most recently received precoder data 506.

In addition, the PAPR estimator 514 may be configured to calculate, based on the precoder data 506, a first estimated PAPR of the transmit node to transmit the first compressed data to the at least one receive node. In some embodiments, the PAPR estimator 514 may calculate, based on the precoder data 506, a second estimated PAPR of the transmit node to transmit the second compressed data to the at least one receive node. Other estimated PAPRs of the transmit node may be calculated to transmit the other compressed data to the at least one receive node. The first, second, and other estimated PAPRs may be calculated sequentially by the PAPR estimator 514 until the corresponding estimated PAPR is less than the PAPR threshold value. Alternately or additionally, the first, second, and other estimated PAPRs may be calculated simultaneously or substantially simultaneously by the PAPR estimator 514 (or by multiple PAPR estimators).

The PAPR estimator 514 may calculate estimated PAPRs based on the precoder data 506 as generally described above with respect to FIG. 4. For example, with combined reference to FIGS. 4 and 5, the first, second, or other compressed data may correspond to the vector $X_N$. At block 404, the PAPR estimator 514 may perform a MIMO transform on the corresponding compressed data based on the precoder data 506 to generate a transformed set of vectors $HX_N$. At block 406, the PAPR estimator 514 may perform an IDFT on the transformed set of vectors $HX_N$ to generate the baseband time sequence f(t). At block 412, the PAPR estimator 514 may calculate the estimated PAPR from the baseband time sequence f(t) according to the above PAPR calculation or other suitable PAPR calculation.

Referring again to FIG. 5, the PAPR estimator 514 or other component of the compression apparatus 500 may also be configured to send the first, second, or other compressed data to the transmit node as the compressed data 510. In some embodiments, the particular one of the first, second, or other compressed data that is sent to the transmit node may depend on which of the first, second, or other estimated PAPRs is first determined to be less than the PAPR threshold value and/or which of the first, second, or other estimated PAPRs is lowest.

The PAPR comparator 516 may be coupled to the PAPR estimator 514 and to the parameter tuner 518. The PAPR comparator 516 may be configured to compare the first estimated PAPR to the PAPR threshold value to determine whether the first estimated PAPR is less than the PAPR threshold value. In some embodiments, the PAPR comparator 516 may compare the second estimated PAPR to the PAPR threshold value to determine whether the second estimated PAPR is less than the PAPR threshold value. The other estimated PAPRs may be compared to the PAPR threshold value to determine whether the other estimated PAPRs are less than the PAPR threshold value. The estimated PAPRs may be compared sequentially to the PAPR threshold value by the PAPR comparator 516 until the corresponding estimated PAPR is determined to be less than the PAPR threshold value. Alternately or additionally, the first, second, and other estimated PAPRs may be compared to each other by the PAPR comparator 516 to determine which is lowest.

The parameter tuner 518 may be coupled to the tunable compressor 512 and to the PAPR comparator 516. The parameter tuner 518 may be configured to modify the set of compression parameters 520 used by the tunable compressor 512 to compress the portion of the raw data 502 based on the comparisons by the PAPR comparator 516 of the first, second, and/or other estimated PAPRs to the PAPR threshold value. The parameter tuner 518 may modify the set of compression parameters 520 by replacing the set of compression parameters 520 with a different set of compression parameters 520 from the compression parameter database 522, which may effectively include altering at least one parameter in the set of compression parameters 520. Alternately or additionally, the parameter tuner 518 may modify the set of compression parameters 520 by modifying a value of at least one of the parameters included in the set of compression parameters 520.

Thus, in at least some embodiments, the tunable compressor 512 may compress the portion of the raw data 502 according to the set, e.g., the first set, of compression parameters 520 to generate the first compressed data. The PAPR estimator 514 may calculate, based on the precoder data 506, the first estimated PAPR of the transmit node to transmit the first compressed data to the at least one receive node. The PAPR comparator 516 may compare the first estimated PAPR to the PAPR threshold value. In response to the first estimated PAPR being less than the PAPR threshold value, the PAPR estimator 514 or other component of the compression apparatus 500 may send the first compressed data to the transmit node as the compressed data 510.

Alternately, and in response to the first estimated PAPR being greater than the PAPR threshold value, the parameter tuner 518 may alter at least one parameter in the first set of compression parameters 520, e.g., by altering a value of the at least one parameter and/or by replacing the first set of compression parameters 520 with another set, e.g., the second set, of compression parameters 520 from the compression parameter database 522. The tunable compressor 512 may compress the portion of the raw data 502 according to the second set of compression parameters 520 to generate the second compressed data. The PAPR estimator 514 may calculate, based on the precoder data 506, the second estimated PAPR of the transmit node to transmit the second compressed data to the at least one receive node. The PAPR comparator 516 may compare the second estimated PAPR to the PAPR threshold value. In response to the second estimated PAPR being less than the PAPR threshold value, the PAPR estimator 514 or other component of the compression apparatus 500 may send the second compressed data to the transmit node as the compressed data 510.

Alternately, and in response to the second estimated PAPR being greater than the PAPR threshold value, the compression apparatus 500 may alter at least one parameter in the current set of compression parameters 520 to generate compressed data, may calculate an estimated PAPR of the compressed data, and may compare the estimated PAPR to the PAPR threshold value. The foregoing operations may be repeated until the estimated PAPR is less than the PAPR threshold value, after which the compressed data corresponding to the estimated PAPR that is less than the PAPR threshold value may be sent to the transmit node. The compression apparatus 500 may continue processing subsequent portions of the raw data 502 as described above, e.g., until all of the raw data 502 has been processed.

In at least some other embodiments, the tunable compressor 512 (or multiple tunable or non-tunable compressors) may compress the portion of the raw data 502 to be transmitted to the at least one receive node multiple times according to multiple different sets of compression parameters 520 to generate multiple different versions of compressed data. For instance, each of the different versions of the compressed data may be generated by compressing the portion of the raw data 502 according to a different one of the sets of compression parameters 520.

The PAPR estimator 514 (or multiple PAPR estimators) may calculate, based on the precoder data 506 and for each of the different versions of the compressed data, estimated PAPR of the transmit node to transmit a corresponding one of the different versions of the compressed data to the at least one receive node. Thus, the PAPR estimator 514 may calculate multiple different estimated PAPRs that include a different estimated PAPR for each of the different versions of the compressed data. The PAPR comparator 516 may compare each of the different estimated PAPRs to each other and may identify a lowest estimated PAPR relative to at least some of the different estimated PAPRs. The PAPR estimator 514 or some other component of the compression apparatus 500 may then send a particular one of the different versions of the compressed data that corresponds to the lowest estimated PAPR to the transmit node to be transmitted to the at least one receive node. The compression apparatus 500 may continue processing subsequent portions of the raw data 502 as described above, e.g., until all of the raw data 502 has been processed.

In embodiments in which the compressed data that is sent to the transmit node is determined by comparison of the corresponding estimated PAPR to the PAPR threshold value and/or by comparison of multiple estimated PAPRs to each other to identify the lowest estimated PAPR, portions of compressed data sent to the transmit node may be compressed according to one or more different sets of compression parameters 520 and/or according to one or more different compression formats. Thus, the compressed data 510 output by the compression apparatus 500 may have inhomogeneous compression. In these and other embodiments, the compressed data 510 may be transmitted by the transmit node to the at least one receive node as one or more wireless transmissions (e.g., as the DL 106 of FIG. 1A) that represent the compressed data 510. The one or more wireless transmissions may be converted to one or more electrical signals and may be decompressed by the at least one receive node.

The inhomogeneous compression may not be problematic for the at least one receive node insofar as many compression formats are basically limited programming languages. For example, Lempel-Ziv compressed data may include a stream of instructions with two basic opcodes: literal(n) and repeat(d, n). The opcode literal(n) may be followed by n bytes of data and may be interpreted as a command to write the n bytes of data into a decompressed output. The opcode repeat(d, n) may be interpreted as a command to look backward d bytes from a current location in the decompressed output and copy the n bytes found there into the output stream. In these and other embodiments, the at least one receive node may therefore decompress inhomogeneously compressed data by executing opcodes, commands, and/or other instructions included in the compressed data as part of the compression.

Figure 6:
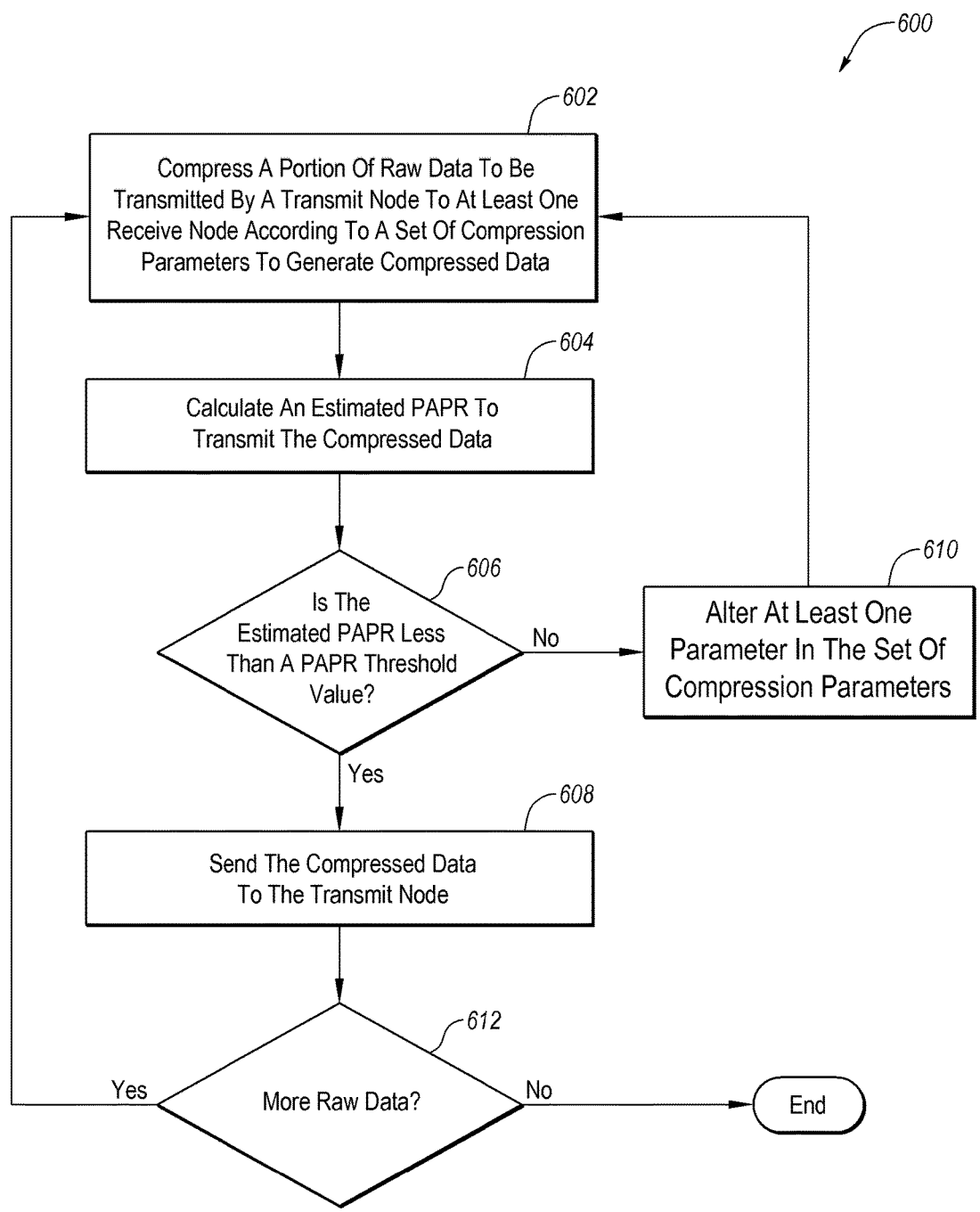
FIG. 6 shows a flow diagram of an example method to tune PAPR of a transmit node.
Figure 7:
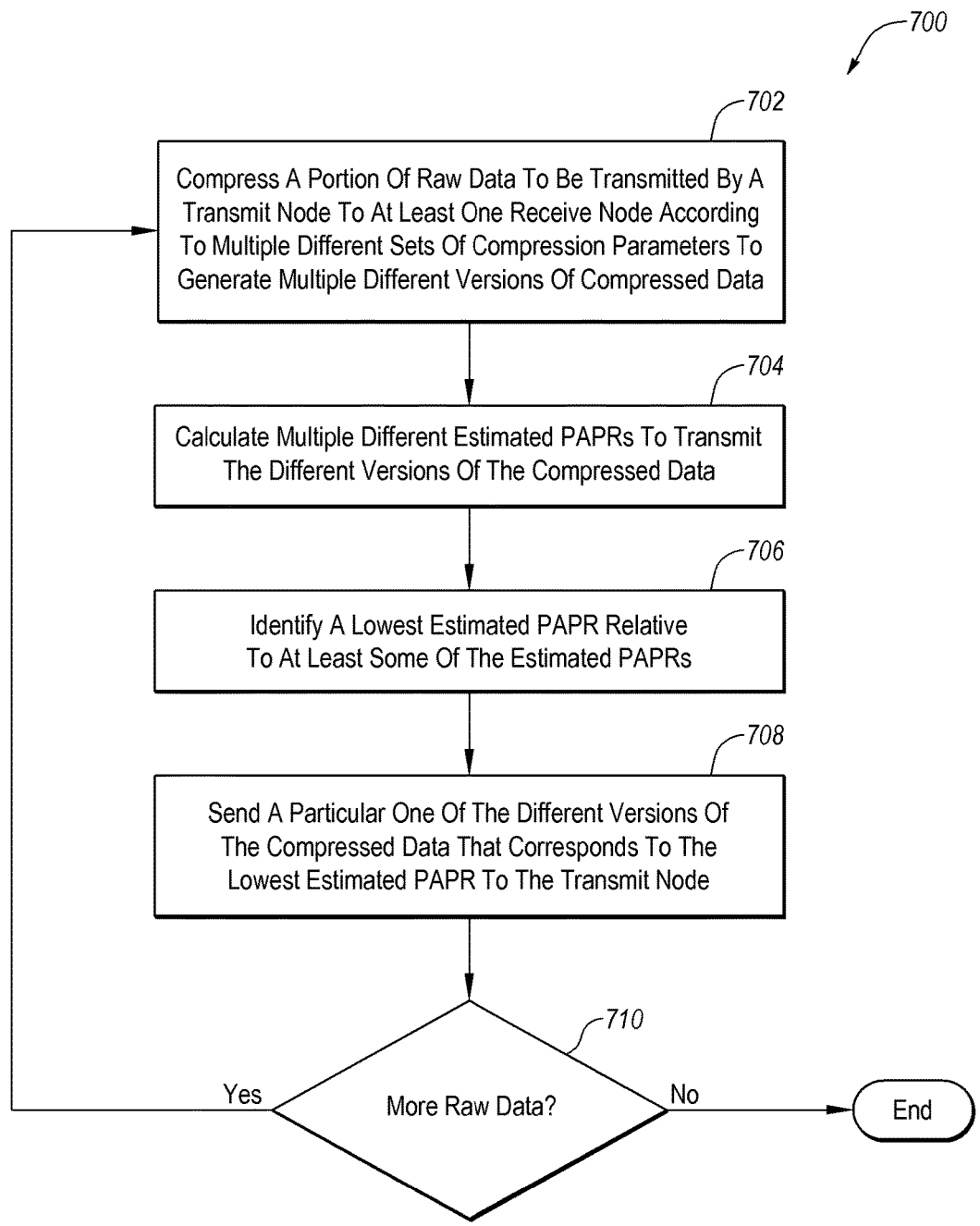
FIG. 7 shows a flow diagram of another example method to tune PAPR of a transmit node.

The components of the compression apparatus of FIG. 5 may perform the foregoing operations and/or other operations such as described with respect to FIGS. 6 and 7.

Modifications, additions, and/or omissions may be made to the compression apparatus of FIG. 5 without departing from the scope of the present disclosure. For example, if the compression apparatus 500 generates multiple versions of compressed data simultaneously or substantially simultaneously without generating the different versions in sequence, the compression apparatus 500 may include multiple non-tunable compressors that each compress a portion of the raw data 502 according to a different set of compression parameters 520 that is fixed for each of the non-tunable compressors. In these and other embodiments, the compression apparatus 500 may omit one or both of the parameter tuner 518 and the compression parameter database 522 and/or may alternately or additionally include multiple PAPR estimators 514 to simultaneously or substantially simultaneously calculate an estimated PAPR for each of the different versions of the compressed data.

FIG. 6 shows a flow diagram of an example method 600 to tune PAPR of a transmit node, arranged in accordance with at least some embodiments described herein. The method 600 may be implemented, in whole or in part, by a compression apparatus such as the compression apparatus 500 of FIG. 5. The method 600 includes various operations, functions, or actions as illustrated by one or more of blocks 602, 604, 606, 608, 610, and/or 612. The method 600 may begin at block 602.

In block 602 ["Compress A Portion Of Raw Data To Be Transmitted By A Transmit Node To At Least One Receive Node According To A Set Of Compression Parameters To Generate Compressed Data"], a portion of raw data to be transmitted by a transmit node to at least one receive node may be compressed according to a set of compression parameters to generate compressed data. For example, the portion of raw data may be compressed according to a first set of compression parameters to generate first compressed data. Compressing the portion of the raw data according to the first set of compression parameters to generate the first compressed data may include compressing the portion of the raw data according to the first set of compression parameters that includes at least one of a first block size, a first compression tree scheme, and a first symbol diversity. Alternately or additionally, the portion of raw data may be compressed according to the set of compression parameters by the tunable compressor 512 of FIG. 5.

Alternately or additionally, in response to the method 600 looping through block 610 from block 606 as described in more detail below, block 602 may include compressing the portion of raw data according to a second set of compression parameters to generate second compressed data. Compressing the portion of the raw data according to the second set of compression parameters to generate the second compressed data may include compressing the portion of the raw data according to the second set of compression parameters that includes at least one of a second block size, a second compression tree scheme, and a second symbol diversity that is not included in the first set of compression parameters. Block 602 may be followed by block 604.

In block 604 ["Calculate An Estimated PAPR To Transmit The Compressed Data"], an estimated PAPR of the transmit node to transmit the compressed data to the at least one receive node may be calculated based on precoder data associated with the at least one receive node. For example, a first estimated PAPR of the transmit node to transmit the first compressed data to the at least one receive node may be calculated based on the precoder data. Alternately or additionally, the estimated PAPR may be calculated by the PAPR estimator 514 of FIG. 5. Block 604 may be followed by block 606.

In block 606 ["Is The Estimated PAPR Less Than A PAPR Threshold Value?"], it may be determined whether the estimated PAPR is less than a PAPR threshold value. For example, it may be determined whether the first estimated PAPR is less than the PAPR threshold value. Alternately or additionally, the PAPR comparator 516 of FIG. 5 may determine whether the estimated PAPR is less than a PAPR threshold value, e.g., by comparing the estimated PAPR to the PAPR threshold value. Block 606 may be followed by block 608 ("Yes" at block 606) or by block 610 ("No" at block 606), each of which will be described.

In block 610 ["Alter At Least One Parameter In The Set Of Compression Parameters"], and in response to the estimated PAPR being greater than the PAPR threshold value, at least one parameter in the set of compression parameters may be altered. For example, in response to the first estimated PAPR being greater than the PAPR threshold value, at least one parameter in the first set of compression parameters may be altered to generate a second set of compression parameters. The at least one parameter may be altered by altering a value of the at least one parameter in the first set of compression parameters to generate the second set of compression parameters and/or by replacing the first set of compression parameters with the second set of compression parameters. Alternately or additionally, the at least one parameter in the set of compression parameters may be altered by the parameter tuner 518 of FIG. 5.

Block 610 may be followed by blocks 602, 604, and 606 in which the same portion of raw data may be compressed according to the second set of compression parameters to generate second compressed data, a second estimated PAPR may be calculated to transmit the second compressed data, and it may be determined whether the second estimated PAPR is less than the PAPR threshold value. Blocks 602, 604, 606, and/or 610 may loop until a current estimated PAPR of the transmit node to send a current version of compressed data to the at least one receive node is less than the PAPR threshold value, at which point the method may proceed to block 608. Alternately, the loop may time out after a particular amount of time and the method 600 may proceed to block 608 even if none of the estimated PAPRs for the different versions of compressed data have been determined to be less than the PAPR threshold value.

In block 608 ["Send The Compressed Data To The Transmit Node"], and in response to the estimated PAPR being less than the PAPR threshold value, the compressed data may be sent to the transmit node. For example, in response to the first estimated PAPR being less than the PAPR threshold value, the first compressed data may be sent to the transmit node to be transmitted to the at least one receive node. Alternately, where the method has looped through block 610 at least once, block 608 may include, in response to the second (or other) estimated PAPR being less than the PAPR threshold value, sending the second (or other) compressed data to the transmit node to be transmitted to the at least one receive node. Alternately or additionally, the compressed data may be sent to the transmit node by the PAPR estimator 514 or other component of the compression apparatus 500 of FIG. 5. Block 608 may be followed by block 612.

In block 612 ["More Raw Data?"], it may be determined whether there is more raw data to be sent to the transmit node. Alternately or additionally, the tunable compressor 512 or other component of the compression apparatus 500 of FIG. 5 may determine whether there is more raw data to be sent to the transmit node. Following block 612, the method 600 may return to block 602 ("Yes" at block 612) or may end ("No" at block 612).

When the method 600 returns to block 602 from block 612, a next portion of the raw data may be processed. For example, a first portion of the raw data may be processed according to one or more of blocks 602, 604, 606, 608, 610, and/or 612 to send a first portion of compressed data to the transmit node that has an estimated PAPR that is less than the PAPR threshold value.

If the raw data includes more portions, the method 600 may return to block 602 where a second portion of the raw data may be compressed according to a set of compression parameters to generate compressed data, followed by blocks 604, 606, 608, 610, and/or 612 as already described above. For example, the second portion of the raw data may be compressed at block 602 according to a third set of compression parameters to generate third compressed data. A third estimated PAPR of the transmit node to transmit the third compressed data may be calculated at block 604. It may be determined at block 606 whether the third estimated PAPR is less than the PAPR threshold value. In response to the third estimated PAPR being less than the PAPR threshold value, the third compressed data may be sent at block 608 to the transmit node. The third set of compression parameters may be different than the first set of compression parameters and the second set of compression parameters such that the compressed data sent to the transmit node and that corresponds to the first and second portions of the raw data may be inhomogeneously compressed.

In some embodiments, calculating the first estimated PAPR (or other estimated PAPRs) may include calculating the first estimated PAPR as a variable that depends on symbols in the first compressed data. The PAPR estimator 514 or other component of the compression apparatus 500 of FIG. 5 may be configured to calculate the first estimated PAPR as the variable. In these and other embodiments, the method 600 may further include identifying a spike in the first estimated PAPR that corresponds to a particular segment of one or more symbols in the portion of the raw data. A remainder of the first estimated PAPR that corresponds to a remainder segment of one or more symbols in the portion of the raw data that excludes the particular segment may also be identified. The PAPR comparator 516 or other component of the compression apparatus 500 of FIG. 5 may be configured to identify the spike and/or the remainder. In response to identifying the spike in the first estimated PAPR and the remainder of the first estimated PAPR, the particular segment may be compressed according to the second set of compression parameters and the remainder segment may be compressed according to the first set of compression parameters to generate inhomogeneous compressed data. The tunable compressor 512 or other component of the compression apparatus of FIG. 5 may be configured to compress the particular segment according to the second set of compression parameters and the remainder segment according to the first set of parameters. In response to a third estimated PAPR of the transmit node to transmit the inhomogeneous compressed data to the at least one receive node being less than the PAPR threshold value, the inhomogeneous compressed data may be sent to the transmit node.

For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed embodiments.

For example, the method 600 may include transmitting, by the transmit node, at least one wireless transmission to the at least one receive node based on the first or second compressed data. In this and other embodiments, the at least one wireless transmission may represent the first compressed data in response to the first estimated PAPR being less than the PAPR threshold value or may represent the second compressed data in response to both the first estimated PAPR being greater than the PAPR threshold value and the second estimated PAPR being less than the PAPR threshold value. An actual PAPR of the transmit node to transmit the at least one wireless transmission may be less than the PAPR threshold value. Sending a corresponding one of the first compressed data or the second compressed data to the transmit node may include outputting the corresponding one of the first compressed data or the second compressed data to an output channel of the transmit node that includes a downstream transmitter. For example, the downstream transmitter may include an antenna, such as the antenna 414 of FIG. 4.

Alternately or additionally, the method 600 may include receiving the precoder data from the transmit node. The precoder data may be received repeatedly over time such that calculating the first estimated PAPR (or other estimated PAPRs) may include calculating the first estimated PAPR based on most recently received precoder data. The precoder data may be received periodically, randomly, on demand, according to a predefined schedule, or in some other manner.

Some embodiments disclosed herein include a non-transitory computer-readable medium that includes computer-readable instructions stored thereon. In response to execution by a processor, the computer-readable instructions may cause the processor to perform or may cause the processor to control performance of the method 600 and/or variations thereof. In these and other embodiments, the processor may be included in a gateway, in the transmit node, or between the gateway and the transmit node.

FIG. 7 shows a flow diagram of another example method 700 to tune PAPR of a transmit node, arranged in accordance with at least some embodiments described herein. The method 700 may be implemented, in whole or in part, by a compression apparatus such as the compression apparatus 500 of FIG. 5. The method 700 includes various operations, functions, or actions as illustrated by one or more of blocks 702, 704, 706, 708, and/or 710. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed embodiments. The method 700 may begin at block 702.

In block 702 ["Compress A Portion Of Raw Data To Be Transmitted By A Transmit Node To At Least One Receive Node According To Multiple Different Sets Of Compression Parameters To Generate Multiple Different Versions of Compressed Data"], a portion of raw data to be transmitted by a transmit node to at least one receive node may be compressed according to multiple different sets of compression parameters to generate multiple different versions of compressed data. The different sets of compression parameters may include at least a first set of compression parameters and a second set of compression parameters. Compressing the portion of the raw data multiple times according to the different sets of compression parameters to generate the different versions of compressed data may include compressing the portion of the raw data according to the first set of compression parameters to generate first compressed data and compressing the portion of the raw data according to the second set of compression parameters to generate second compressed data. The first set of compression parameters may include at least one of a first block size, a first compression tree scheme, and a first symbol diversity. The second set of compression parameters may include at least one of a second block size, a second compression tree scheme, and a second symbol diversity that is not included in the first set of compression parameters. Alternately or additionally, the portion of the raw data may be compressed according to the different sets of compression parameters to generate the different versions of the compressed data by the tunable compressor 512 (or by multiple tunable or non-tunable compressors) of FIG. 5. Block 702 may be followed by block 704.

In block 704 ["Calculate Multiple Different Estimated PAPRs To Transmit The Different Versions Of The Compressed Data"], an estimated PAPR of the transmit node to transmit a corresponding one of the different versions of the compressed data to the at least one receive node may be calculated based on precoder data associated with the at least one receive node and for each of the different versions of the compressed data. As a result, multiple different estimated PAPRs may be calculated that include a different estimated PAPR for each of the different versions of the compressed data. For example, a first estimated PAPR may be calculated for the first compressed data, a second estimated PAPR may be calculated for the second compressed data, and so on.

Alternately or additionally, the estimated PAPRs may be calculated by the PAPR estimator 514 of FIG. 5. Block 704 may be followed by block 706.

In block 706 ["Identify A Lowest Estimated PAPR Relative To At Least Some Of The Estimated PAPRs"], a lowest estimated PAPR relative to at least some of the different estimated PAPRs may be identified. For example, the first estimated PAPR, the second estimated PAPR, and/or other estimated PAPRs may be compared to each other to identify one that is lower than at least some of the different estimated PAPRs. Alternately estimated PAPR identified as the lowest estimated PAPR may be the lowest of all of the different estimated PAPRs. Alternately or additionally, the lowest estimated PAPR relative to at least some of the different estimated PAPRs may be identified by the PAPR comparator 516 of FIG. 5 by comparing at least some of the estimated PAPRs to each other. Block 706 may be followed by block 708.

In block 708 ["Send A Particular One Of The Different Versions Of The Compressed Data That Corresponds To The Lowest Estimated PAPR To The Transmit Node"], a particular one of the different versions of the compressed data that corresponds to the lowest estimated PAPR may be sent to the transmit node to be transmitted to the at least one receive node. Alternately or additionally, the particular one of the different versions of the compressed data that corresponds to the lowest estimated PAPR may be sent to the transmit node by the PAPR estimator 514 or other component of the compression apparatus 500 of FIG. 5. Block 708 may be followed by block 710.

In block 710 ["More Raw Data?"], it may be determined whether there is more raw data to be sent to the transmit node. Alternately or additionally, the tunable compressor 512 or other component of the compression apparatus 500 of FIG. 5 may determine whether there is more raw data to be sent to the transmit node. Following block 710, the method 700 may return to block 702 ("Yes" at block 710) or may end ("No" at block 710).

When the method 700 returns to block 702 from block 710, a next portion of the raw data may be processed. For example, a first portion of the raw data may be processed according to one or more of blocks 702, 704, 706, 708, and/or 710 to send a first portion of compressed data to the transmit node that has an estimated PAPR that is the lowest estimated PAPR relative to at least some of the different estimated PAPRs.

If the raw data includes more portions, the method 700 may return to block 702 where a second portion of the raw data may be compressed according to multiple different sets of compression parameters to generate multiple different versions of compressed data, followed by blocks 704, 706, 708, and/or 710 as already described above. For example, the second portion of the raw data may be compressed at block 702 according to the multiple different sets of compression parameters to generate multiple different versions of second compressed data. At block 704, multiple different second estimated PAPRs may be calculated for the multiple different versions of the second compressed data. A lowest estimated PAPR relative to at least some of the multiple different second estimated PAPRs may be identified at block 706. At block 708, a particular one of the different versions of the second compressed data that has the lowest estimated PAPR relative to the at least some of the multiple different second estimated PAPRs may be sent to the transmit node to be transmitted to the at least one receive node.

The method 700 may alternately or additionally include transmitting, by the transmit node, at least one wireless transmission to the at least one receive node. The at least one wireless transmission may represent the particular one of the different versions of the compressed data that corresponds to the lowest estimated PAPR. An actual PAPR of the transmit node to transmit the at least one wireless transmission may be less than the PAPR threshold value. Sending the particular one of the different versions of the compressed data that corresponds to the lowest estimated PAPR to the transmit node may include outputting the particular one of the different versions of the compressed data to an output channel of the transmit node that includes a downstream transmitter. For example, the downstream transmitter may include an antenna, such as the antenna 414 of FIG. 4.

Alternately or additionally, the method 700 may include receiving the precoder data from the transmit node. The precoder data may be received repeatedly over time such that calculating the first estimated PAPR (or other estimated PAPRs) may include calculating the first estimated PAPR based on most recently received precoder data. The precoder data may be received periodically, randomly, on demand, according to a predefined schedule, or in some other manner.

Some embodiments disclosed herein include a non-transitory computer-readable medium that includes computer-readable instructions stored thereon. In response to execution by a processor, the computer-readable instructions may cause the processor to perform or may cause the processor to control performance of the method 700 and/or variations thereof. In these and other embodiments, the processor may be included in a gateway, in the transmit node, or between the gateway and the transmit node.

In the methods 600 and 700 of FIGS. 6 and 7, PAPR may be calculated on an individual symbol basis notwithstanding the compressed data (or different versions of the compressed data) for each portion of raw data may represent more than one symbol. In these and other embodiments, PAPR may be calculated for multiple symbols (e.g., 200 symbols) of the compressed data simultaneously or substantially simultaneously. The estimated PAPR for the compressed data may include an average of all of the PAPRs calculated across all of the symbols and/or some other metric based on the PAPRs calculated across all of the symbols.

Coherence time may be the time for which precoder data for a given channel such as a DL between an access point or other transmit node and a UE or other receive node is valid. Coherence time may shrink as a receive node moves faster. One or both of the methods 600 and 700 of FIGS. 6 and 7 may be implemented at a compression apparatus depending on typical receive node behavior around the transmit tower.

Many LTE implementations may divide up parts of an LTE cell and may split resource bands among different access points to keep different cells from interfering with each other. While PAPR may be calculated across all the subcarriers of each access point, separate resource bands at separate access points may not impact PAPR at a given access point. Accordingly, resource band management as usually practiced may not impact the described embodiments. If a single access point separates resource bands for multiple users in the same sector (which may be an unusual case) then the PAPR may be calculated using the multiple users on the different resource bands as PAPR may be impacted by all transmissions from the same amplifier at the same time.

Reducing PAPR in LTE and other radio access networks may help achieve high performance in such networks because it may be difficult to design HPAs which are linear over a wide dynamic range. The HPA nonlinearities may create both in-band and out-of-band distortions. The in-band distortion may degrade BER performance and capacity of the network, whereas the out-of-band distortion which may arise from spectral broadening effect of the HPA may affect other users operating in adjacent frequency bands. In addition, high PAPR may increase the power usage of an access point, which may account for a substantial portion of total cost of the access point.

Embodiments described herein may effectively reduce PAPR without requiring changes to the standards used within LTE and/or other networks and without reducing useful bit rate by introducing distortions or requiring side information to be transmitted in other PAPR reduction methods. The described embodiments may leverage the flexibility of multiple data compression standards to find data compression parameters that reduce PAPR.

Figure 8:
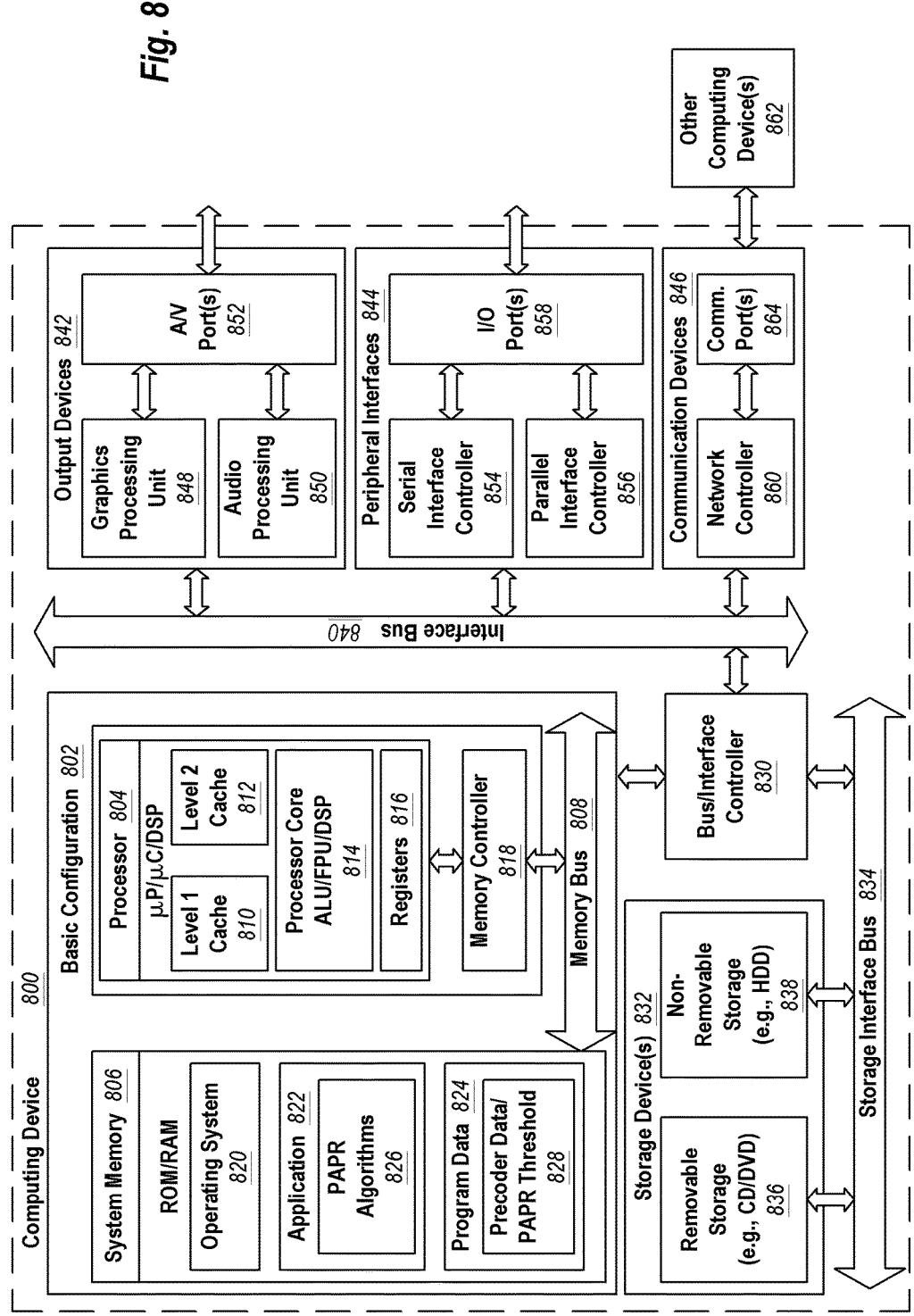
FIG. 8 is a block diagram illustrating an example computing device that is arranged to tune PAPR of a transmit node, all arranged in accordance with at least some embodiments described herein.

FIG. 8 is a block diagram illustrating an example computing device 800 that is arranged to tune PAPR of a transmit node, arranged in accordance with at least some embodiments described herein. The computing device 800 of FIG. 8 may include or may be included in the gateway 310 of FIG. 3 and/or the compression apparatus 500 of FIG. 5, for example. In a very basic configuration 802, computing device 800 typically includes one or more processors 804 and a system memory 806. A memory bus 808 may be used for communicating between processor 804 and system memory 806.

Depending on the desired configuration, processor 804 may be of any type including a microprocessor (µP), a microcontroller (µC), a digital signal processor (DSP), or any combination thereof. Processor 804 may include one or more levels of caching, such as a level one cache 810 and a level two cache 812, a processor core 814, and registers 816. The example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including volatile memory (such as RAM), nonvolatile memory (such as ROM, flash memory, etc.), or any combination thereof. System memory 806 may include an operating system 820, one or more applications 822, and program data 824. Application 822 may include a PAPR algorithm 826 that is arranged to tune PAPR of a transmit node as generally described with respect to FIGS. 5-7. Program data 824 may include precoder data and/or a PAPR threshold value 828 ("Precoder Data/PAPR Threshold" in FIG. 8) that may be useful for tuning PAPR of a transmit node as is described herein. In some embodiments, application 822 may be arranged to operate with program data 824 on operating system 820 such that PAPR of a transmit node may be tuned to less than the PAPR threshold value and/or may be reduced by altering compression parameters used to compress raw data and/or by sending versions of compressed data that have lower estimated PAPRs than other versions of the compressed data as described herein.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

System memory 806, removable storage devices 836, and non-removable storage devices 838 are examples of computer storage media. Computer storage media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.), sensors, or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer-readable media" as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. Computing device 800 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A method to tune peak to average power ratio (PAPR) of a transmit node, the method comprising:
   compressing a portion of raw data to be transmitted by the transmit node to at least one receive node according to a first set of compression parameters to generate first compressed data;
   calculating, based on precoder data associated with the at least one receive node, a first estimated PAPR of the transmit node to transmit the first compressed data to the at least one receive node;
   in response to the first estimated PAPR being less than a PAPR threshold value, sending the first compressed data to the transmit node; and
   in response to the first estimated PAPR being greater than the PAPR threshold value:
      altering at least one parameter in the first set of compression parameters to generate a second set of compression parameters;
      compressing the portion of the raw data according to the second set of compression parameters to generate second compressed data, wherein the portion of the raw data compressed according to the first set of compression parameters is a same portion as the portion of the raw data compressed according to the second set of compression parameters; and
      in response to a second estimated PAPR of the transmit node to transmit the second compressed data to the at least one receive node being less than the PAPR threshold value, sending the second compressed data to the transmit node,
   wherein compressing the portion of the raw data according to the first set of compression parameters to generate the first compressed data comprises compressing the portion of the raw data according to the first set of compression parameters that includes at least one of a first block size, a first compression tree scheme, and a first symbol diversity.

2. The method of claim 1, wherein the portion of the raw data comprises a first portion of the raw data, the method further comprising:
   compressing a second portion of the raw data to be transmitted by the transmit node to the at least one receive node according to a third set of compression parameters to generate third compressed data; and
   in response to a third estimated PAPR of the transmit node to transmit the third compressed data to the at least one receive node being less than the PAPR threshold value, sending the third compressed data to the transmit node, wherein the third compressed data is compressed according to the third set of compression parameters that is different than the first set of compression parameters and the second set of compression parameters.

3. The method of claim 1, wherein:
   calculating the first estimated PAPR comprises calculating the first estimated PAPR as a variable that depends on symbols in the first compressed data; and
   the method further comprises:
      identifying a spike in the first estimated PAPR that corresponds to a particular segment of one or more symbols in the portion of the raw data;
      identifying a remainder of the first estimated PAPR that corresponds to a remainder segment of one or more symbols in the portion of the raw data that excludes the particular segment;
      in response to identification of the spike in the first estimated PAPR and identification of the remainder of the first estimated PAPR, compressing the particular segment according to the second set of compression parameters and compressing the remainder segment according to the first set of compression parameters to generate inhomogeneous compressed data; and
      in response to a third estimated PAPR of the transmit node to transmit the inhomogeneous compressed data to the at least one receive node being less than the PAPR threshold value, sending the inhomogeneous compressed data to the transmit node.

4. The method of claim 1, further comprising transmitting, by the transmit node, at least one wireless transmission to the at least one receive node based on the first or second compressed data, wherein:
   the at least one wireless transmission represents the first compressed data in response to the first estimated PAPR being less than the PAPR threshold value or represents the second compressed data in response to both the first estimated PAPR being greater than the PAPR threshold value and the second estimated PAPR being less than the PAPR threshold value;
   an actual PAPR of the transmit node to transmit the at least one wireless transmission is less than the PAPR threshold value; and
   sending a corresponding one of the first compressed data or the second compressed data to the transmit node includes outputting the corresponding one of the first compressed data or the second compressed data to an output channel of the transmit node that includes a downstream transmitter.

5. The method of claim 1, further comprising receiving the precoder data from the transmit node repeatedly over time such that calculating the first estimated PAPR comprises calculating the first estimated PAPR based on most recently received precoder data.

6. The method of claim 1, wherein:
compressing the portion of the raw data according to the second set of compression parameters comprises compressing the portion of the raw data according to the second set of compression parameters that includes at least one of a block size, a compression tree scheme, or a symbol diversity that is not included in the first set of compression parameters;
the compressing the portion of the raw data according to the first set of compression parameters, the calculating, the altering, and the compressing the portion of the raw data according to the second set of compression parameters are executed in a loop that includes:
compressing the portion of the raw data to be transmitted by the transmit node to the at least one receive node according to a corresponding set of compression parameters to generate corresponding compressed data, wherein each corresponding set of compression parameters is different than every other corresponding set of compression parameters and all sets of compression parameters include the first and second sets of compression parameters;
calculating, based on the precoder data associated with the at least one receive node, a corresponding estimated PAPR of the transmit node to transmit the corresponding compressed data to the at least one receive node;
determining whether the corresponding estimated PAPR to transmit the corresponding compressed data is less than the PAPR threshold value; and
in response to the corresponding estimated PAPR to transmit the corresponding compressed data being greater than the PAPR threshold value, altering at least one parameter in the corresponding set of compression parameters to generate a next corresponding set of compression parameters to be used as the corresponding set of compression parameters in a subsequent execution of the loop; and
in response to the corresponding estimated PAPR to transmit the corresponding compressed data being less than the PAPR threshold value, the method further comprises terminating execution of the loop and sending the corresponding compressed data to the transmit node.

7. A compression apparatus configured to tune peak to average power ratio (PAPR) of a transmit node, the compression apparatus comprising:
a tunable compressor configured to compress a portion of raw data to be transmitted by the transmit node to at least one receive node according to a first set of compression parameters to generate first compressed data, wherein the first set of compression parameters includes at least one of a first block size, a first compression tree scheme, and a first symbol diversity;
a PAPR estimator configured to calculate, based on precoder data associated with the at least one receive node, a first estimated PAPR of the transmit node to transmit the first compressed data to the at least one receive node;

a PAPR comparator coupled to the PAPR estimator and configured to compare the first estimated PAPR to a PAPR threshold value; and
a parameter tuner coupled to the tunable compressor and to the PAPR comparator, and configured to modify compression parameters of the tunable compressor based on the comparison of the first estimated PAPR to the PAPR threshold value, wherein:
in response to the first estimated PAPR being less than the PAPR threshold value, the PAPR estimator is further configured to send the first compressed data to the transmit node; and
in response to the first estimated PAPR being greater than the PAPR threshold value:
the parameter tuner is further configured to alter at least one parameter in the first set of compression parameters to generate a second set of compression parameters;
the tunable compressor is further configured to compress the portion of the raw data according to the second set of compression parameters to generate second compressed data, wherein the portion of the raw data compressed according to the first set of compression parameters is a same portion as the portion of the raw data compressed according to the second set of compression parameters; and
in response to a second estimated PAPR of the transmit node to transmit the second compressed data to the at least one receive node being less than the PAPR threshold value, the PAPR estimator is further configured to send the second compressed data to the transmit node.

8. The compression apparatus of claim 7, wherein:
the portion of the raw data comprises a first portion of the raw data;
the tunable compressor is further configured to compress a second portion of the raw data to be transmitted by the transmit node to the at least one receive node according to a third set of compression parameters to generate third compressed data; and
in response to a third estimated PAPR of the transmit node to transmit the third compressed data to the at least one receive node being less than the PAPR threshold value, the PAPR estimator is further configured to send the third compressed data to the transmit node, wherein the third set of compression parameters is different than the first set of compression parameters and the second set of compression parameters.

9. The compression apparatus of claim 7, wherein:
the PAPR estimator is configured to calculate the first estimated PAPR as a variable that depends on symbols in the first compressed data;
the PAPR comparator is further configured to identify a spike in the first estimated PAPR that corresponds to a particular segment of one or more symbols in the portion of the raw data and to identify a remainder of the first estimated PAPR that corresponds to a remainder segment of one or more symbols in the portion of the raw data that excludes the particular segment;
in response to the spike in the first estimated PAPR being identified and the remainder of the first estimated PAPR being identified, the tunable compressor is further configured to compress the particular segment according to the second set of compression parameters and the remainder segment according to the first set of compression parameters to generate inhomogeneous compressed data; and in response to a third estimated PAPR of the transmit node to transmit the inhomogeneous compressed data to the at least one receive node being less than the PAPR threshold value, the PAPR estimator is further configured to send the inhomogeneous compressed data to the transmit node.

10. The compression apparatus of claim 7, wherein:
the compression apparatus is included as a component of the transmit node;
the transmit node is configured to transmit at least one wireless transmission to the at least one receive node based on the first or second compressed data;
the at least one wireless transmission represents the first compressed data in response to the first estimated PAPR being less than the PAPR threshold value or represents the second compressed data in response to both the first estimated PAPR being greater than the PAPR threshold value and the second estimated PAPR being less than the PAPR threshold value;
an actual PAPR of the transmit node to transmit the at least one wireless transmission is less than the PAPR threshold value; and
the transmit node includes an output channel with a downstream transmitter, and the PAPR estimator is configured to send a corresponding one of the first compressed data or the second compressed data to the transmit node by output of the corresponding one of the first compressed data or the second compressed data to the output channel.

11. The compression apparatus of claim 10, wherein the transmit node comprises at least one of a base station in a cellular communication network or an Evolved Node B.

12. The compression apparatus of claim 7, wherein the PAPR estimator is further configured to receive the precoder data from the transmit node repeatedly over time such that the first estimated PAPR is calculated based on most recently received precoder data.

13. The compression apparatus of claim 7, wherein:
the second set of compression parameters according to which the tunable compressor is configured to compress the portion of the raw data includes at least one of a block size, a compression tree scheme, or a symbol diversity that is not included in the first set of compression parameters;
the tunable compressor, the PAPR estimator, the PAPR comparator, and the parameter tuner are configured to cooperate to execute in a loop as follows:
the tunable compressor is configured to compress the portion of the raw data to be transmitted by the transmit node to the at least one receive node according to a corresponding set of compression parameters to generate corresponding compressed data, wherein each corresponding set of compression parameters is different than every other corresponding set of compression parameters and all sets of compression parameters include the first and second sets of compression parameters;
the PAPR estimator is configured to calculate, based on the precoder data associated with the at least one receive node, a corresponding estimated PAPR of the transmit node to transmit the corresponding compressed data to the at least one receive node;
the PAPR comparator is configured to determine whether the corresponding estimated PAPR to transmit the corresponding compressed data is less than the PAPR threshold value; and in response to the corresponding estimated PAPR to transmit the corresponding compressed data being greater than the PAPR threshold value, the parameter tuner is configured to alter at least one parameter in the corresponding set of compression parameters to generate a next corresponding set of compression parameters to be used as the corresponding set of compression parameters in a subsequent execution of the loop; and
in response to the corresponding estimated PAPR to transmit the corresponding compressed data being less than the PAPR threshold value, the parameter tuner is configured to terminate execution of the loop and send the corresponding compressed data to the transmit node.

14. A method to tune peak to average power ratio (PAPR) of a transmit node, the method comprising:
compressing a portion of raw data to be transmitted by the transmit node to at least one receive node multiple times according to multiple different sets of compression parameters to generate multiple different versions of compressed data;
calculating, based on precoder data associated with the at least one receive node and for each of the different versions of the compressed data, an estimated PAPR of the transmit node to transmit a corresponding one of the different versions of the compressed data to the at least one receive node, wherein multiple different estimated PAPRs are calculated that include a different estimated PAPR for each of the different versions of the compressed data;
identifying a lowest estimated PAPR relative to at least some of the different estimated PAPRs; and
sending a particular one of the different versions of the compressed data that corresponds to the lowest estimated PAPR to the transmit node to be transmitted to the at least one receive node,
wherein compressing the portion of the raw data multiple times according to the different sets of compression parameters to generate the different versions of compressed data comprises:
compressing the portion of the raw data according to a first set of compression parameters that includes at least one of a first block size, a first compression tree scheme, and a first symbol diversity, wherein the different sets of compression parameters include the first set of compression parameters and a second set of compression parameters; and
compressing the portion of the raw data according to the second set of compression parameters that includes at least one of a second block size, a second compression tree scheme, and a second symbol diversity that is not included in the first set of compression parameters.

15. The method of claim 14, wherein compressing the portion of the raw data multiple times according to multiple different sets of compression parameters to generate multiple different versions of compressed data comprises simultaneously:
compressing the portion of the raw data according to the first set of compression parameters to generate first compressed data; and
compressing the portion of the raw data according to the second set of compression parameters to generate second compressed data.

16. The method of claim 14, wherein the portion of the raw data comprises a first portion of the raw data, the different estimated PAPRs comprise different first estimated PAPRs, and the different versions of compressed data comprise different versions of first compressed data, the method further comprising:

compressing a second portion of the raw data multiple times according to the different sets of compression parameters to generate multiple different versions of second compressed data; and sending a particular one of the different versions of the second compressed data that has a lowest estimated PAPR relative to at least some of multiple different second estimated PAPRs of the different versions of the second compressed data to the transmit node to be transmitted to the at least one receive node.

17. The method of claim 14, further comprising transmitting, by the transmit node, at least one wireless transmission to the at least one receive node, wherein:

the at least one wireless transmission represents the particular one of the different versions of the compressed data that corresponds to the lowest estimated PAPR; and sending the particular one of the different versions of the compressed data that corresponds to the lowest estimated PAPR to the transmit node includes outputting the particular one of the different versions of the compressed data to an output channel of the transmit node that includes a downstream transmitter.

18. The method of claim 14, further comprising receiving the precoder data from the transmit node repeatedly over time such that calculating the different estimated PAPRs comprises calculating the different estimated PAPRs based on most recently received precoder data.

19. A compression apparatus configured to tune peak to average power ratio (PAPR) of a transmit node, the compression apparatus comprising:

a tunable compressor configured to compress a portion of raw data to be transmitted by the transmit node to at least one receive node multiple times according to multiple different sets of compression parameters to generate multiple different versions of compressed data;

a PAPR estimator coupled to the tunable compressor and configured to calculate, based on precoder data associated with the at least one receive node and for each of the different versions of the compressed data, an estimated PAPR of the transmit node to transmit a corresponding one of the different versions of the compressed data to the at least one receive node, wherein multiple different estimated PAPRs are calculated that include a different estimated PAPR for each of the different versions of the compressed data; and a PAPR comparator coupled to the PAPR estimator and configured to compare each of the different estimated PAPRs to each other and to identify a lowest estimated PAPR relative to at least some of the different estimated PAPRs, wherein:

wherein the PAPR estimator is further configured to send a particular one of the different versions of the compressed data that corresponds to the lowest estimated PAPR to the transmit node to be transmitted to the at least one receive node, and the different sets of compression parameters comprise:

a first set of compression parameters that includes at least one of a first block size, a first compression tree scheme, and a first symbol diversity; and a second set of compression parameters that includes at least one of a second block size, a second compression tree scheme, and a second symbol diversity that is not included in the first set of compression parameters.

20. The compression apparatus of claim 19, wherein compression of the portion of the raw data multiple times according to multiple different sets of compression parameters to generate multiple different versions of compressed data comprises simultaneous compression of:

the portion of the raw data according to the first set of compression parameters to generate first compressed data; and the portion of the raw data according to the second set of compression parameters to generate second compressed data.

21. The compression apparatus of claim 19, wherein:

the portion of the raw data comprises a first portion of the raw data, the different estimated PAPRs comprise different first estimated PAPRs, and the different versions of compressed data comprise different versions of first compressed data;

the tunable compressor is further configured to compress a second portion of the raw data multiple times according to the different sets of compression parameters to generate multiple different versions of second compressed data; and the PAPR estimator is further configured to send a particular one of the different versions of the second compressed data that has a lowest estimated PAPR relative to at least some of multiple different second estimated PAPRs of the different versions of the second compressed data to the transmit node to be transmitted to the at least one receive node.

22. The compression apparatus of claim 19, wherein:

the compression apparatus is included as a component of the transmit node;

the transmit node is configured to transmit at least one wireless transmission to the at least one receive node;

the at least one wireless transmission represents the particular one of the different versions of the compressed data that corresponds to the lowest estimated PAPR; and the transmit node includes an output channel with a downstream transmitter and the PAPR estimator is configured to send the particular one of the different versions of the compressed data that corresponds to the lowest estimated PAPR to the transmit node by output of the particular one of the different versions of the compressed data to the output channel.

23. The compression apparatus of claim 19, wherein the PAPR estimator is further configured to receive the precoder data from the transmit node repeatedly over time such that the different estimated PAPRs are calculated based on most recently received precoder data.

* * * * *

UNITED STATES PATENT AND TRADEMARK OFFICE
CERTIFICATE OF CORRECTION

| | | |
|---|---|---|
| PATENT NO. | : 9,635,529 B2 | Page 1 of 1 |
| APPLICATION NO. | : 14/297450 | |
| DATED | : April 25, 2017 | |
| INVENTOR(S) | : Kruglick et al. | |

It is certified that error appears in the above-identified patent and that said Letters Patent is hereby corrected as shown below:

In the Claims

In Column 31, Line 57, delete "wherein the" and insert -- the --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*